(12) United States Patent
Yuki et al.

(10) Patent No.: US 11,017,521 B2
(45) Date of Patent: *May 25, 2021

(54) BOTTLE STORAGE AND SYSTEM

(71) Applicant: Panasonic Intellectual Property Management Co., Ltd., Osaka (JP)

(72) Inventors: Yasuhiro Yuki, Kanagawa (JP); Masahiro Ishii, Hyogo (JP); Mitsuhiro Aso, Osaka (JP); Takayuki Hayami, Osaka (JP); Tomoko Kajimoto, Kyoto (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 0 days.

This patent is subject to a terminal disclaimer.

(21) Appl. No.: 16/811,942

(22) Filed: Mar. 6, 2020

(65) Prior Publication Data

US 2020/0211176 A1 Jul. 2, 2020

Related U.S. Application Data

(63) Continuation of application No. 15/890,997, filed on Feb. 7, 2018, now Pat. No. 10,621,712.

(30) Foreign Application Priority Data

Feb. 23, 2017 (JP) .............................. JP2017-032641
Oct. 30, 2017 (JP) .............................. JP2017-208814

(51) Int. Cl.
*G06T 7/00* (2017.01)
*F25D 3/06* (2006.01)
(Continued)

(52) U.S. Cl.
CPC ............. *G06T 7/0004* (2013.01); *C12H 1/22* (2013.01); *F25D 3/06* (2013.01); *F25D 3/08* (2013.01);
(Continued)

(58) Field of Classification Search
None
See application file for complete search history.

(56) References Cited

U.S. PATENT DOCUMENTS 10,621,712 B2 * 4/2020 Yuki ..................... F25D 29/005
2006/0120752 A1 6/2006 McVicker et al.
2008/0047986 A1 2/2008 Will et al.

FOREIGN PATENT DOCUMENTS

JP 2010-47313 A 3/2010

* cited by examiner

*Primary Examiner* — Leon Flores
(74) *Attorney, Agent, or Firm* — Greenblum & Bernstein, P.L.C.

(57) ABSTRACT

A bottle storage includes a housing portion that houses a bottle therein, a cooling-warming portion that is provided around the housing portion, a sensor which detects insertion of the bottle into the housing portion, an image capture portion that captures an image of the bottle housed in the housing portion, a controller that causes the image capture portion to perform image capture for capturing the image of the bottle when the bottle is sensed to be inserted into the housing portion by the sensor, an information manager that identifies at least a brand of the bottle, based on recognition result of the bottle image captured by the control of the controller, and an output portion that outputs characteristics of a beverage of the brand identified by the information manager.

6 Claims, 39 Drawing Sheets

(51) Int. Cl.
*F25D 29/00* (2006.01)
*F25D 31/00* (2006.01)
*C12H 1/22* (2006.01)
*F25D 3/08* (2006.01)

(52) U.S. Cl.
CPC ........... *F25D 29/00* (2013.01); *F25D 29/005* (2013.01); *F25D 31/007* (2013.01); *F25D 2303/0831* (2013.01); *F25D 2303/0832* (2013.01); *F25D 2331/803* (2013.01); *F25D 2331/809* (2013.01); *F25D 2700/06* (2013.01); *G06T 2207/10141* (2013.01); *G06T 2207/30128* (2013.01)

FIG. 21

| BRAND TYPE | CID | BRAND NAME | DETERMINATION INFORMATION | | BREWER INFORMATION | RETAILER |
|---|---|---|---|---|---|---|
| | | | CHARACTER STRING | CHARACTERISTIC PATTERN | | |
| JAPANESE LIQUOR SAKE | C11 | SAKURA (Sakura) | SAKE SAKURA (Year) AZ Brewery | 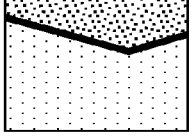 | AZ BREWERY ESTABLISHED: 1880 LOCATION: IWATE-KEN LATITUDE: 39.641483 LONGITUDE: 141.947746 | EC-1 RT-1 |
| | C12 | MAIKA (Maika) | GINJO MAIKA Maika (Year) BC Brewery | 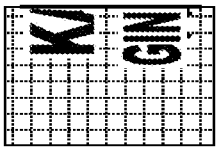 | BC BREWERY ESTABLISHED: 1950 LOCATION: TOKYO LATITUDE: 36.693507 LONGITUDE: 139.095221 | EC-2 RT-1 RT-2 |
| | ... | ... | ... | ... | ... | ... |
| WINE | C21 | Nature (Nachure) | Nature Chile (Year) XY Winery |  | XY WINERY ESTABLISHED: 1960 LOCATION: CHILE | EC-21 RT-2 |
| | ... | ... | ... | ... | ... | ... |

FIG. 22

| DATE | TIME | LID | CID | DEGREE OF CERTAINTY | DRINKING RECORD |
|---|---|---|---|---|---|
| 2011/1/4 | 19:30 | L1 | C11 | 0.876 | True |
| | 19:40 | L2 | C11 | | |
| | 19:55 | L3 | C11 | | |
| | 20:05 | L4 | C12 | 0.357 | False |
| | 20:17 | L5 | C12 | | |
| | 20:23 | L6 | C12 | | |
| 2011/1/8 | 21:11 | L7 | C21 | 0.953 | True |
| | 21:23 | L8 | C21 | | |
| ... | ... | ... | ... | ... | ... |

FIG. 24

| NOTIFIER (LED) | DISPLAY PORTION (MAIN-UNIT SCREEN) | SOUND INPUT/OUTPUT PORTION |
|---|---|---|
| STARTUP COLOR: WHITE | STARTUP LOGO | STARTUP SOUND |
| STANDBY COLOR: BLUE | STANDBY LIST | STANDBY SOUND |
| ANALYSIS COLOR: RED | LOGO DURING SCAN | SCAN SOUND |
| ANALYSIS COMPLETED: BLUE BLINKING | ANALYSIS-RESULT IMAGE LIST | ANALYSIS RESULT SOUND |
| FAVORITE ADDITION: YELLOW | FAVORITE INPUT SCREEN | INPUT SOUND |
| FAVORITE ADDITION COMPLETED: YELLOW BLINKING | FAVORITE ADDITION RESULT | FAVORITE-ADDITION RESULT SOUND |

FIG. 26

| CID | LABEL DISPLAY (GENERAL) | LABEL DISPLAY (SPECIFIC) | FOOD THAT GOES WELL | TASTE CHART | BREWERY INFORMATION | MENU AT RESTAURANT/BAR |
|---|---|---|---|---|---|---|
| C11 | SAKE SAKURA | SAKE SAKURA 2010 | Cheese | Rich | Brewer | Squid ink |
| C12 | MAI KA GINJO | N/A | Chicken | Mellow | Map | Pizza |
| C21 | Nature | 1998 Nature | Iburigakko | Fresh | Aging curve | Foie gras |
| ⋮ | ⋮ | ⋮ | ⋮ | ⋮ | ⋮ | ⋮ |

FIG. 27A
FIG. 27B
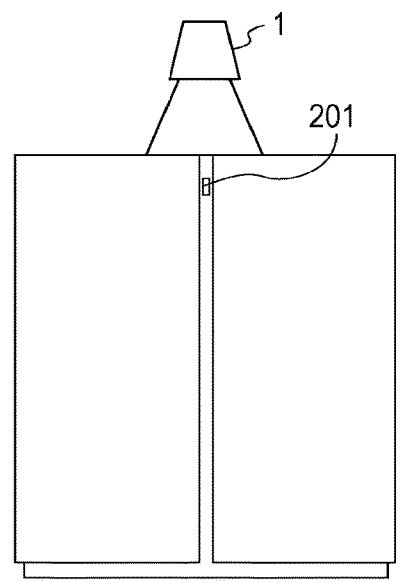
FIG. 28
| UID=001 | FAVORITE ADDITION TIME | FAVORITE LEVEL | CUMULATIVE DETERMINATION COUNT |
|---|---|---|---|
| C11 | 2011/1/4 20:06 | 3 | 1 |
| C12 | 2011/1/8 21:22 | 4 | 10 |
|  |  |  |  |
| ... | ... | ... | ... |

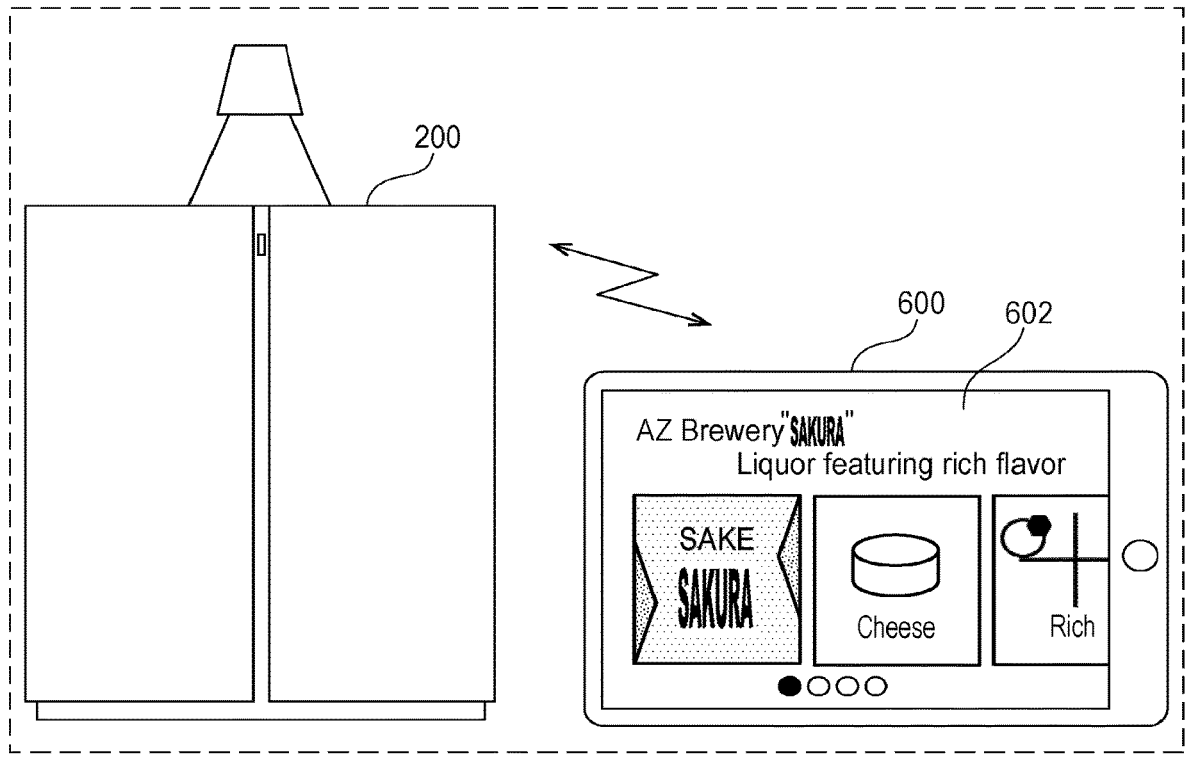

FIG. 40

| DATE | TIME | LID | CID | OTHER LOGS | IMAGE STORAGE PATH |
|---|---|---|---|---|---|
| 2011/1/4 | 19:30 | L1 | C11 | ROTATION PHOTOGRAPHY (BACK LABEL) | ./img/label_f_C11.jpg ./img/label_b_C11.jpg |
| | 19:40 | L2 | C11 | | |
| | 19:55 | L3 | C11 | ROTATION (34°) | |
| | 20:05 | L4 | C12 | | |
| | 20:17 | L5 | C12 | | |
| | 20:23 | L6 | C12 | | |
| 2011/1/8 | 21:11 | L7 | C21 | ROTATION PHOTOGRAPHY (BACK LABEL) | ./img/label_f_C12.jpg |
| | 21:23 | L8 | C21 | | |
| ⋮ | ⋮ | ⋮ | ⋮ | ⋮ | |

FIG. 44

| CID | LABEL DISPLAY (GENERAL) | LABEL DISPLAY (SPECIFIC) | FOOD THAT GOES WELL | TASTE CHART | BREWERY INFORMATION | MENU AT RESTAURANT/BAR | SOUND SOURCE |
|---|---|---|---|---|---|---|---|
| C11 | SAKE SAKURA | SAKE SAKURA 2010 | Cheese | Rich | Brewer | Squid ink | ./011.wav Iwate folk song Sakura Spring |
| C12 | MAI KA GINJO | N/A | Chicken | Mellow | Map | Pizza | ./012.wav Tokyo Spectacular |
| C21 | Nature | 1998 Nature | Iburigakko | Fresh | Aging curve | Foie gras | ./C21.wav Chile |
| ... | ... | ... | ... | ... | ... | ... | ... |

BOTTLE STORAGE AND SYSTEM

CROSS REFERENCE TO RELATED APPLICATIONS

This application is a continuation application of U.S. application Ser. No. 15/890,997, filed Feb. 7, 2018, which claims the foreign priority benefit of JP 2017-208814, filed Oct. 30, 2017, and JP 2017-032641, filed Feb. 23, 2017. The entire disclosures of all of the above-identified applications are incorporated herein by reference in their entirety.

BACKGROUND

1. Technical Field

The present disclosure relates to a bottle storage that stores a bottle, such as a wine bottle, therein and a system using the bottle storage.

2. Description of the Related Art

Drinking wine is enjoyed all over the world. Japanese liquor (sake) is also beginning to spread throughout the world and is put into bottles (720 ml bottles), which have generally the same size as that for wine, for distribution.

Wine cellars are available that can store wine at constant temperatures. Wine cellars that are commonly in widespread use electrically cool wine by using compressors or the like. Although wine cellars are superior in temperature management, they are large in size and are troublesome to carry, and further compressors and fans therein produce sound. Thus, wine cellars are not often suitable for use on tables.

Accordingly, wine coolers that cool wine by using ice water are available as bottle storages for use on tables. The wine coolers using ice water, however, have a drawback in that wine is excessively cooled to temperatures lower than appropriate temperatures (e.g., 5° C. to 20° C.). When a bottle containing wine is put into ice water, the bottle gets wet, which makes it difficult to hold the bottle, and also a label on the bottle gets wet, which may deteriorate visibility of the label.

As one approach to overcoming such inconvenience, Japanese Patent No. 4406683 (hereinafter referred to as "Patent Document 1") discloses a wine cooler in which refrigerant packs are removably fixed to the inner wall of an insulating container. In Patent Document 1, the number of refrigerant packs and the size thereof are adjusted to make it possible to flexibly adjust the temperature. The wine cooler disclosed in Patent Document 1 has a shape in which a space through which a label on a wine bottle can be viewed is provided between the wine bottle and the refrigerant packs. With this structure, the label on the wine bottle can be viewed even when the wine bottle is housed in the wine cooler.

The wine cooler disclosed in Patent Document 1, however, is thought to require a further improvement.

SUMMARY

In one general aspect, the techniques disclosed here feature a bottle storage that includes a housing portion that houses a bottle therein; a cooling-warming portion that is provided around the housing portion; a rotation portion that rotates the bottle housed in the housing portion; an image capture portion that captures an image of the bottle housed in the housing portion; a controller that controls the bottle rotation performed by the rotation portion and the image capture performed by the image capture portion, based on the bottle image captured by the image capture portion; an information manager that identifies at least a brand of the bottle, based on the bottle image captured by the control of the controller; and an output portion that outputs at least one of the brand identified by the information manager and relevant information regarding the identified brand.

These general and specific aspects may be implemented using a system, a method, and a computer program, and any combination of systems, methods, and computer programs.

According to one aspect of the present disclosure, information regarding the brand of a bottle to be cooled can be presented to a user in an easily viewable manner.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 21 illustrates an example of an information table stored in a brand database;

FIG. 22 illustrates an example of a bottle-insertion history log stored in a log-information storage unit;

FIG. 24 illustrates an example of external notifications given by the bottle storage;

FIG. 26 illustrates examples of images displayed by a display portion;

FIG. 27A is a view illustrating an example of a verification result image displayed by the display portion;

FIG. 27B is a view illustrating an example in which an LED is made to light up to indicate that verification was performed;

FIG. 28 illustrates an example of a table obtained by favorite addition processing;

FIG. 33 illustrates a state in which information stored in the bottle storage is displayed on an information device;

FIG. 34 illustrates the contents of a favorite table stored in the log-information storage unit when cooperation with the information device is performed;

FIG. 40 illustrates an example in which rotation information is added to the insertion history log;

FIG. 44 illustrates an example of a table in which sound source information is stored in association with content IDs;

DETAILED DESCRIPTION

An embodiment of the present disclosure will be described in detail with reference to the accompanying drawings. However, an overly detailed description may be omitted herein. For example, a detailed description of already well-known things and a redundant description of substantially the same configuration may be omitted herein.

This is to avoid the following description becoming overly redundant and to facilitate understanding of those skilled in the art.

The accompanying drawings and the following description are provided so as to allow those skilled in the art to fully understand the present disclosure and are not intended to limit the subject matter recited in the claims.

<1> Structure of Bottle Storage

Figure 1A:
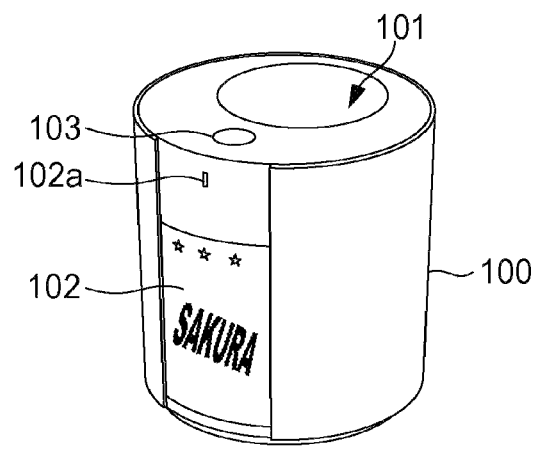
FIG. 1A is a perspective view illustrating an external configuration of a bottle storage.
Figure 1B:
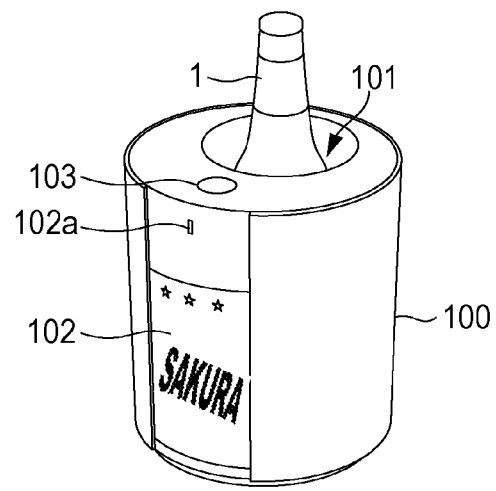
FIG. 1B is a perspective view illustrating a state in which a bottle is put into the bottle storage.
Figure 1C:
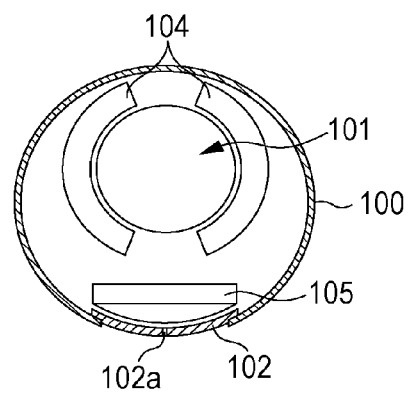
FIG. 1C is a schematic sectional view illustrating an internal configuration of the bottle storage.

FIGS. 1A, 1B, and 1C are diagrams illustrating an external appearance of a bottle storage in an embodiment. FIG. 1A is a perspective view illustrating an external configuration of a bottle storage 100, FIG. 1B is a perspective view illustrating a state in which a wine bottle (hereinafter referred to simply as "bottle") 1 is put into the bottle storage 100, and FIG. 1C is a schematic sectional view, viewed from an upper direction, of an internal configuration of the bottle storage 100. The bottle storage 100 in the present embodiment is not limited to the wine bottle 1 and can be widely used as a storage for a bottle in which beverage, such as champagne or Japanese liquor, is contained.

The bottle storage 100 has a generally circular cylindrical shape. The bottle storage 100 has therein a housing portion 101 having space for housing the bottle 1. The bottle storage 100 has, on its side surface, a display portion 102, including a liquid-crystal display or the like, and a notifier 102a, including a light-emitting diode (LED) or the like. The bottle storage 100 has, on its top surface, an operation input portion 103, including an electrostatic button or the like. As shown in FIG. 1C, cooling-warming devices 104 are provided around the housing portion 101.

The bottle storage 100 further has therein an image capture portion 105, including a camera or the like. The image capture portion 105 is disposed at a position where it can capture an image of the bottle 1 housed in the housing portion 101. Specifically, the image capture portion 105 is provided at a reverse side position of the display portion 102 at a certain distance from the housing portion 101. In other words, the image capture portion 105 is placed away from the cooling-warming devices 104. This can suppress malfunction due to excessive cooling of the image capture portion 105 and the display portion 102 (e.g., a camera and a circuit board for a display). Also, the brand of a bottle or the like is displayed on the display portion, as described below, and thus, since the image capture portion 105 is disposed at the reverse side of the display portion 102, it is possible to guide a user so as to insert the bottle into the housing portion 101 so that a label on the bottle faces the front (i.e., so that the label comes into an image-capture region of the image capture portion 105). This can improve the recognition rate of labels, can simplify a mechanism for recognizing labels, or can reduce the amount of processing for recognizing labels.

Figure 2:
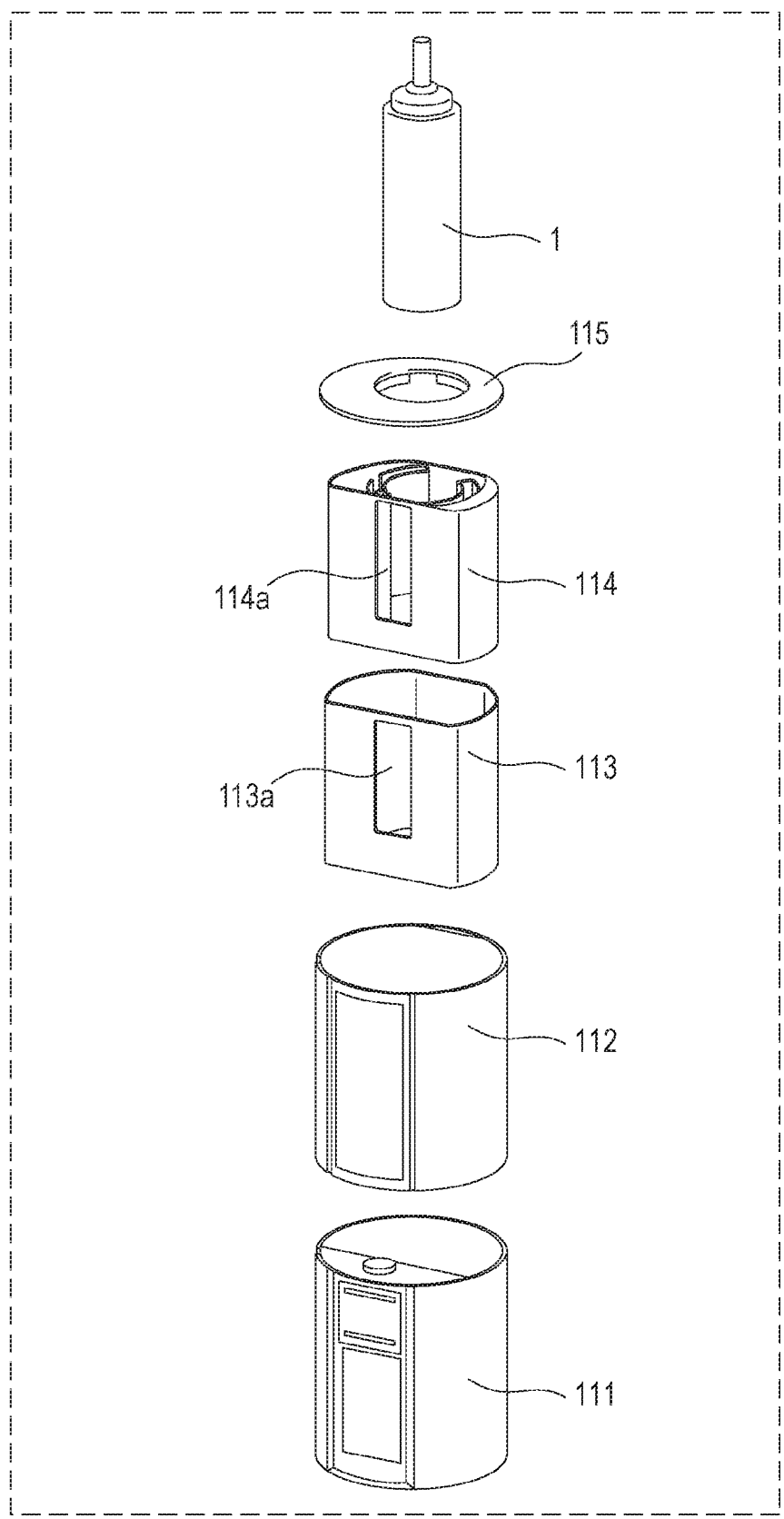
FIG. 2 is an exploded perspective view illustrating case components included in the bottle storage.

FIG. 2 is an exploded perspective view illustrating case components included in the bottle storage 100. A case 111 serves as a base for the bottle storage 100, and the image capture portion 105, a bottle table 117 (described below and illustrated in FIG. 4) and so on are attached to the case 111. A case 112 is a case that serves as an outer casing of the bottle storage 100. A receptacle 113 is a water receptacle for receiving water that is generated from the cooling-warming devices 104 and so on. A cam box 114 is a case for housing mechanism components. An upper lid 115 is removably fixed to top surfaces of the cases 111 and 112, for example, by a magnetic force. When the upper lid 115 is attached to the cases 111 and 112, the operation input portion 103, including the electrostatic button, provided on the upper lid 115 is electrically connected to a circuit board (not illustrated) provided in the case 111.

The receptacle 113 has an opening 113a, and the cam box 114 has an opening 114a. Thus, the image capture portion 105 disposed outside the receptacle 113 and the cam box 114 can capture an image of the bottle 1, housed in the receptacle 113 and the cam box 114, via the openings 113a and 114a.

Figure 3:
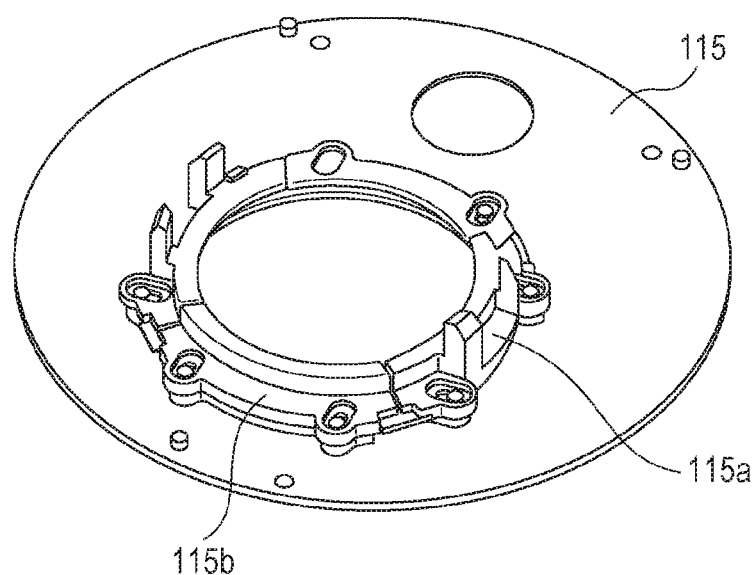
FIG. 3 is a perspective view of an upper lid, viewed from a reverse side.

FIG. 3 is a perspective view of the upper lid 115, viewed from a reverse side. The upper lid 115 is provided with guides 115a and 115b.

Figure 4:
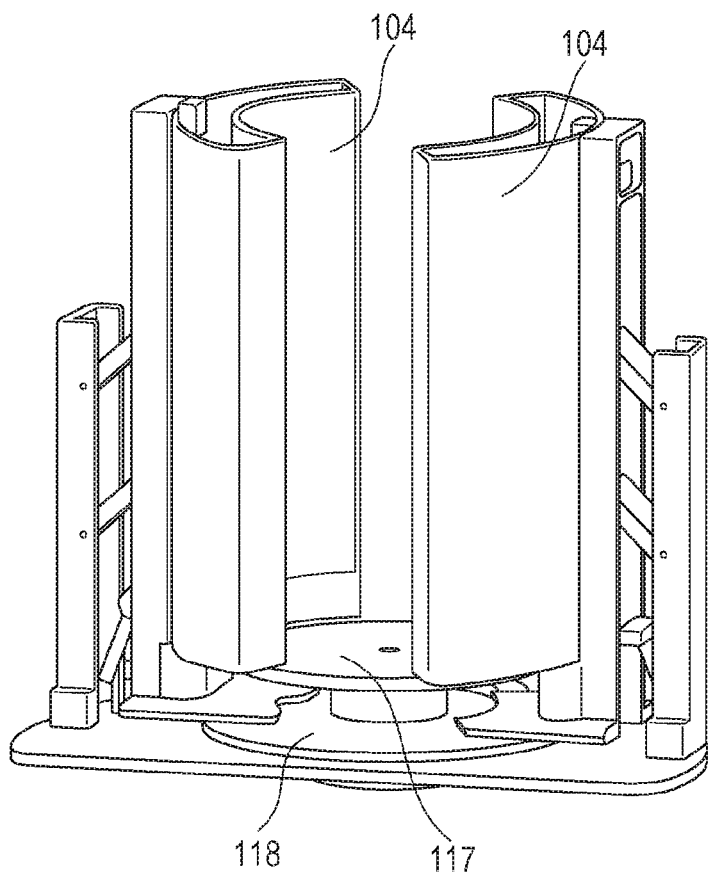
FIG. 4 is a perspective view illustrating a structure around cooling-warming devices.
Figure 5:
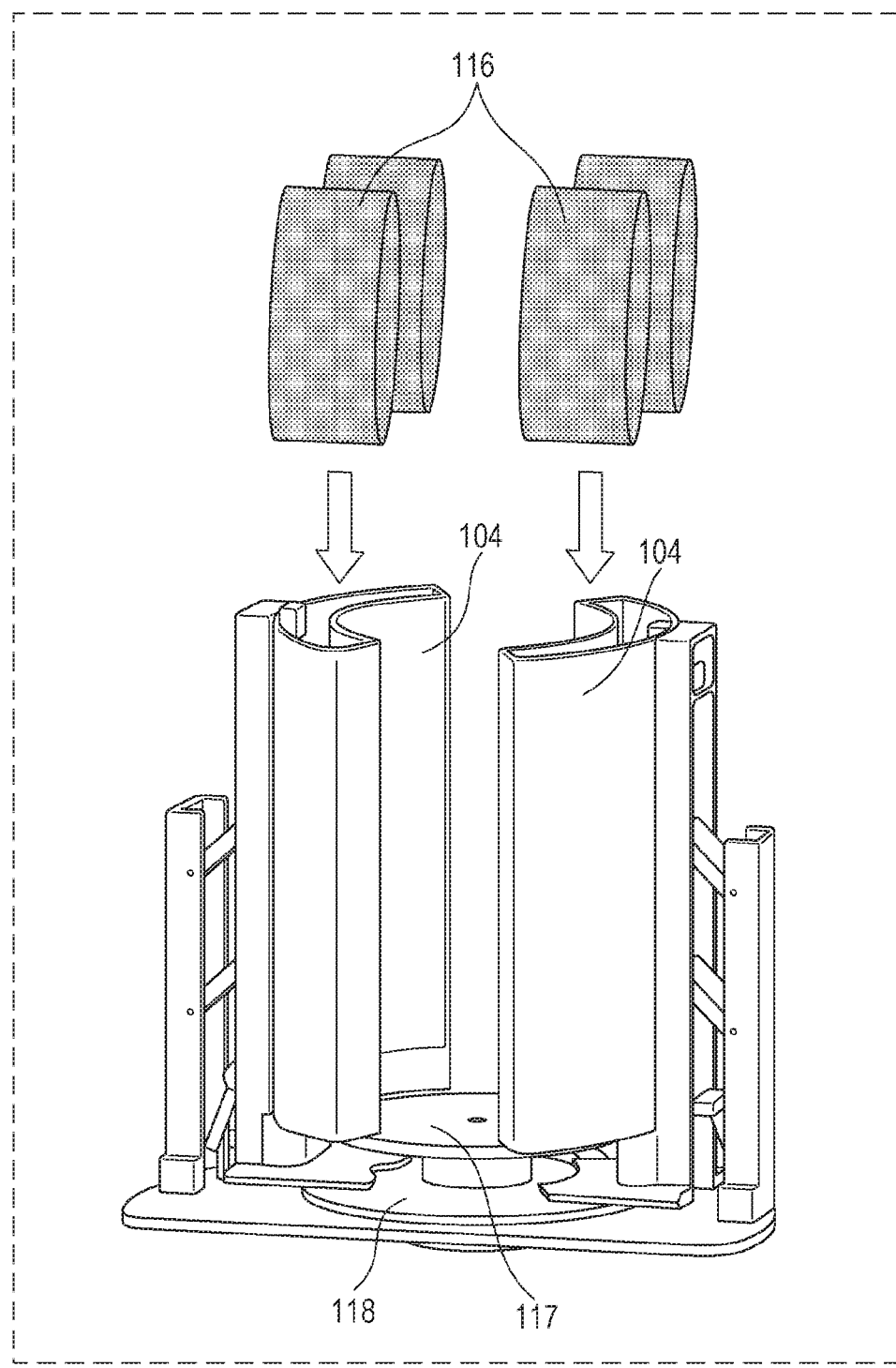
FIG. 5 is a perspective view illustrating the structure around the cooling-warming devices.

FIGS. 4 and 5 are perspective views illustrating a structure around the cooling-warming devices 104. The cooling-warming devices 104 are constituted by a pair of containers disposed around the bottle 1, and a cooling-warming medium 116 is put into each of the containers. The cooling-warming medium 116 is the so-called "cold storage agent" or "refrigerant" and is a medium that is cooled to a temperature of, for example, 0° in advance by another cooling-warming device. When the cooling-warming medium 116 is heated in advance, the bottle storage 100 can be provided with a heat-retaining function. In the cooling-warming devices 104, the surfaces that face the bottle 1 are formed of metal having high thermal conductivity, thus making it possible to efficiently cool the bottle 1.

A disc-shaped bottle table 117 is provided below the cooling-warming devices 104. The bottle table 117 can be rotated by a motor (not illustrated). Thus, the bottle 1 placed on the bottle table 117 can be rotated in conjunction with the bottle table 117. The cooling-warming devices 104 are independent from the bottle table 117 and thus are not rotated. Hence, the orientation of the bottle 1 that is seen through gaps of the containers in the cooling-warming devices 104 changes in accordance with the rotation position of the bottle table 117. In other words, the image capture portion 105 can capture an image of the bottle 1 from various angles through the gaps of the containers in the cooling-warming devices 104.

A bearing base 118 conveys the driving force of the motor (not illustrated) to the containers included in the cooling-warming devices 104, and the motor moves the containers in directions in which they are close to each other and in directions in which they are away from each other. When the containers are moved in the directions in which they are close to each other, the cooling capability increases, and when the containers are moved in the directions in which they are away from each other, the cooling efficiency decreases.

When the upper lid 115 is attached to the top portion of the case 111, a hook portion of the guide 115a enters the inside portions of the containers in the cooling-warming devices 104, so that the top portions of the cooling-warming devices 104 are held by the guide 115a. Also, a circular protrusion of the guide 115b abuts against inner circumferential surfaces of the cooling-warming devices 104, so that the top portions of the cooling-warming devices 104 are held by the guide 115b. When the containers are moved in the directions in which they are close to each other and in the directions in which they are away from each other, the guides 115a and 115b are moved so that the diameter of a circle defined thereby decreases and increases in accordance with the movement. Thus, even when the motor moves lower end portions of the containers, included in the cooling-warming devices 104, in the directions in which they are close to each other and in the directions in which they are away from each other, the guides 115a and 115b operate in conjunction with the movement to thereby allow upper end portions of the containers to be supported.

Figure 6:
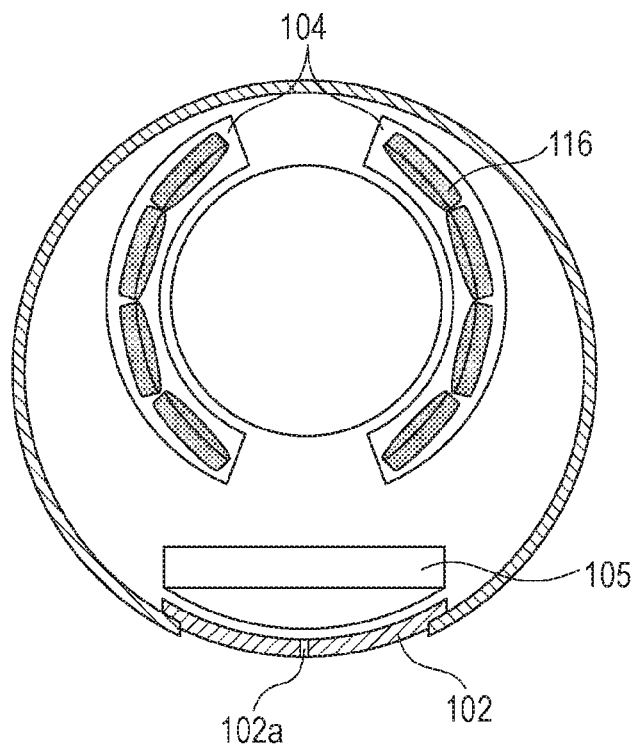
FIG. 6 is a schematic sectional view illustrating a state in which a cooling-warming medium is put into the cooling-warming devices.

FIG. 6 is a schematic sectional view illustrating a state in which the cooling-warming medium 116 is put in the cooling-warming devices 104. Although a case in which the cooling-warming devices 104 are constituted by a pair of containers has been described above in the present embodiment, they may be constituted by one container or three or more containers. However, it is necessary to ensure an image-capture path for the image capture portion 105 to capture an image of the bottle 1.

Figure 7:
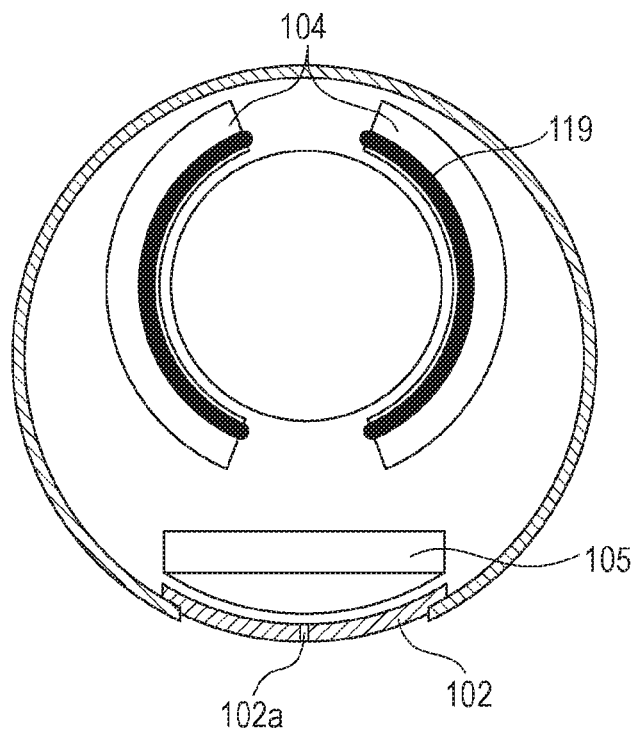
FIG. 7 is a schematic sectional view illustrating a case in which Peltier elements are used in the cooling-warming devices.

Although, in the present embodiment, the cooling-warming devices 104 are constituted by the containers, and the cooling-warming medium 116 is put into the containers to realize a cooling-warming, the configuration of the cooling-warming devices 104 is not limited thereto. For example, Peltier elements 119 or the like may be provided on the surfaces that face the bottle 1 to perform electrical cooling, as in a schematic sectional view in FIG. 7. Such electrical cooling may be performed in combination with the cooling-warming medium 116 or may be performed singularly.

Figure 8:
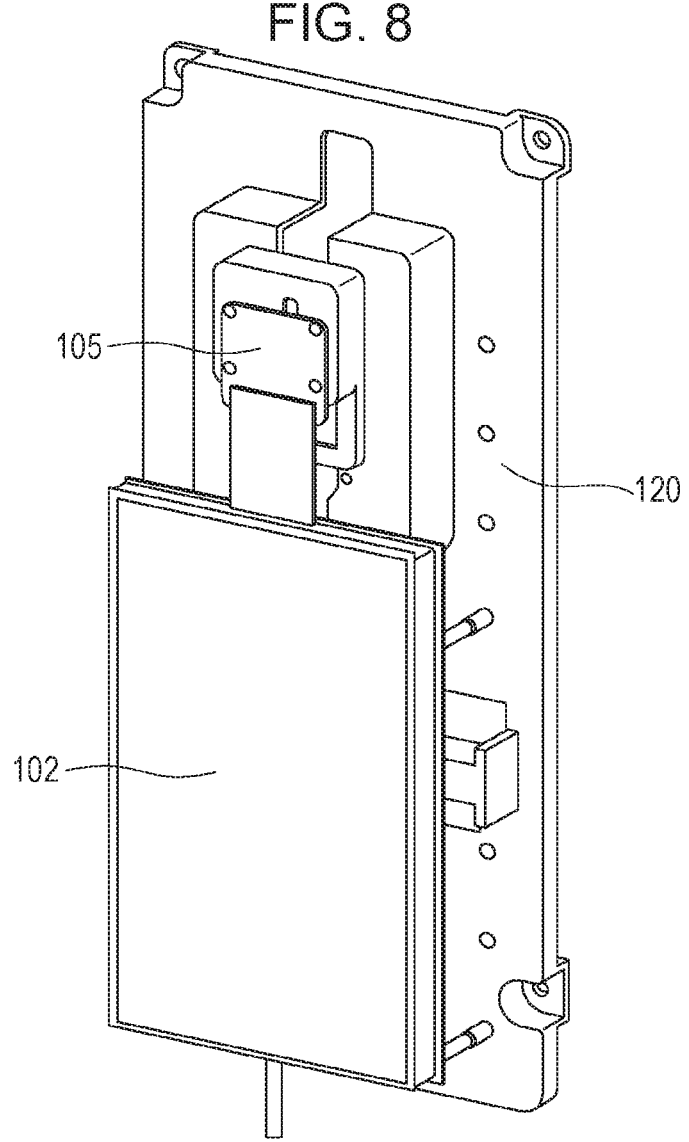
FIG. 8 is a perspective view illustrating a state in which an image capture portion is attached to a circuit board.

FIG. 8 is a perspective view illustrating a specific state in which the display portion 102, including a liquid-crystal display, and the image capture portion 105, including a camera, are attached to a circuit board 120, viewed from the front side of the bottle storage 100. The front side of the bottle storage 100 is the side at which the display portion 102 is located. The circuit board 120 is attached to the case 111 (FIG. 2).

Figure 9:
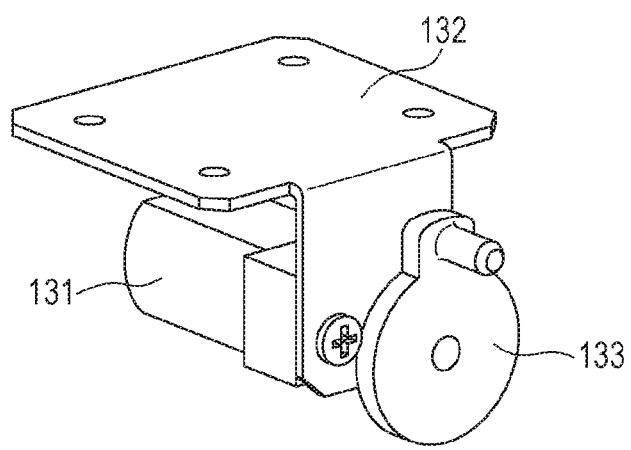
FIG. 9 is a view illustrating a condensation prevention mechanism for the image capture portion.
Figure 10A:
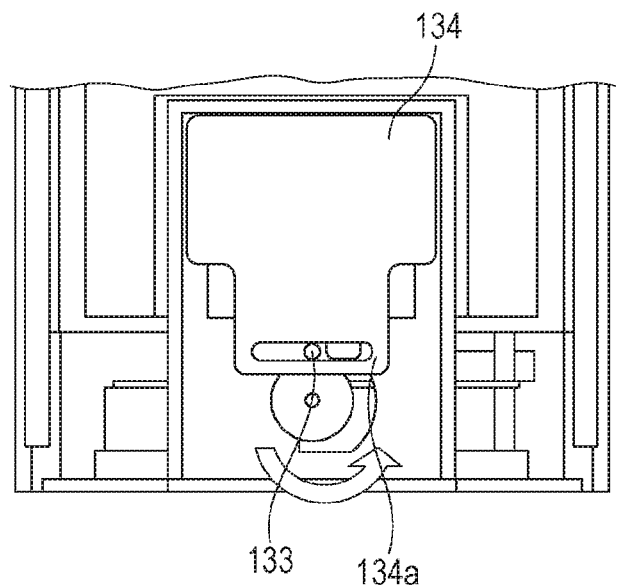
FIG. 10A is a view illustrating a case in which a shutter is closed.
Figure 10B:
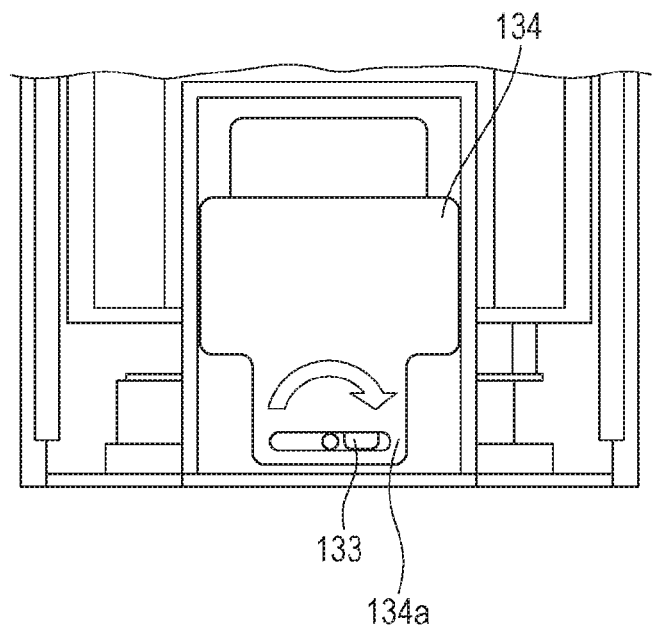
FIG. 10B is a view illustrating a case in which the shutter is open.

FIGS. 9, 10A, and 10B illustrate a condensation prevention mechanism for the image capture portion 105. The bottle storage 100 has a condensation prevention function for preventing condensation of a lens of the image capture portion 105. As illustrated in FIG. 9, a motor 131 is attached to the case 111 with an attachment plate 132 interposed therebetween. A motor shaft 133 is provided along the rotation axis of the motor 131. FIGS. 10A and 10B are views of the image capture portion 105 viewed from the direction of the bottle 1. The motor shaft 133 is inserted through a long hole 134a in a shutter 134. Thus, the shutter 134 can be put into a closed state illustrated in FIG. 10A and an open state illustrated in FIG. 10B, in accordance with rotation position of the motor 131. When the image capture is not performed, the shutter 134 is put into the closed state illustrated in FIG. 10A, and when the image capture is performed, the shutter 134 is put into the open state illustrated in FIG. 10B, thereby making it possible to suppress condensation of the image capture portion 105 which is caused by cooling.

Next, a description will be given of a simplified bottle storage. A simplified bottle storage described below lacks the display portion 102, including a liquid-crystal display or the like.

Figure 11A:
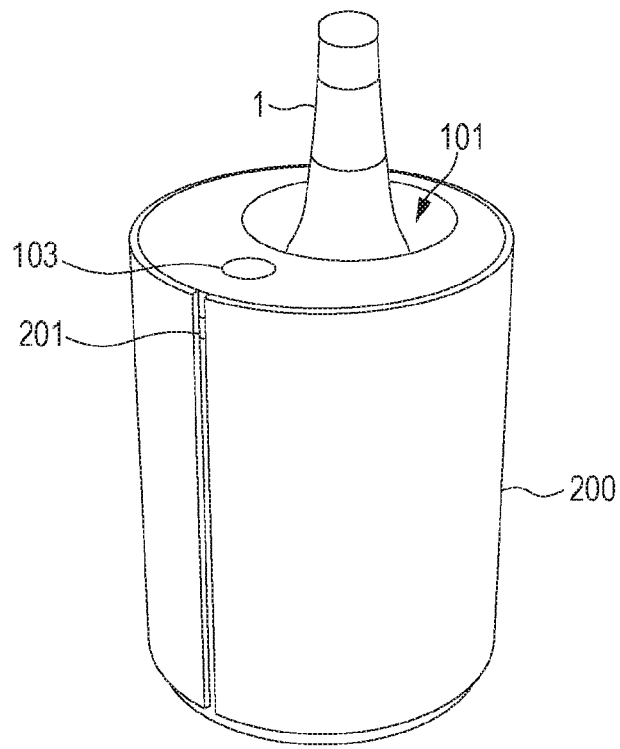
FIG. 11A is a perspective view illustrating an external configuration of a simplified bottle storage according to the embodiment.
Figure 11B:
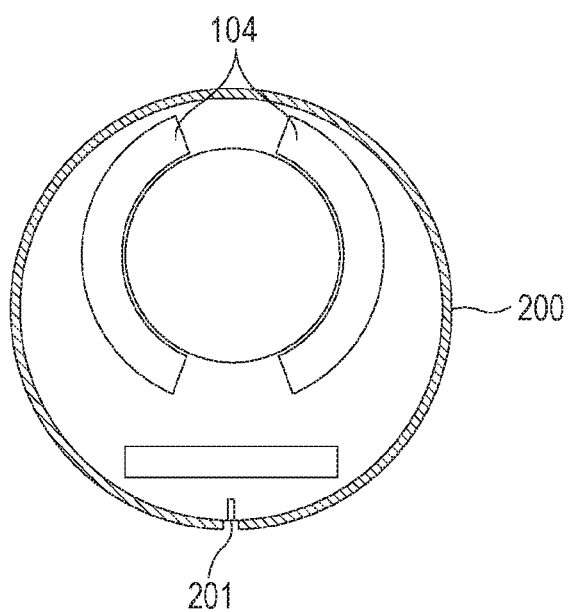
FIG. 11B is a schematic sectional view illustrating an internal configuration of the bottle storage.

FIGS. 11A and 11B illustrate a general configuration of a simplified bottle storage 200 according to the embodiment. In FIGS. 11A and 11B, portions corresponding to those in FIG. 1 are denoted by the same reference numerals. FIG. 11A is a perspective view of an external configuration of the bottle storage 200, and FIG. 11B is a schematic sectional view illustrating an internal configuration of the bottle storage 200. The bottle storage 200 lacks the display portion 102, including a liquid-crystal display or the like, and has a notifier 201, including an LED. The number of LEDs may be one or may be two or more.

Figure 12:
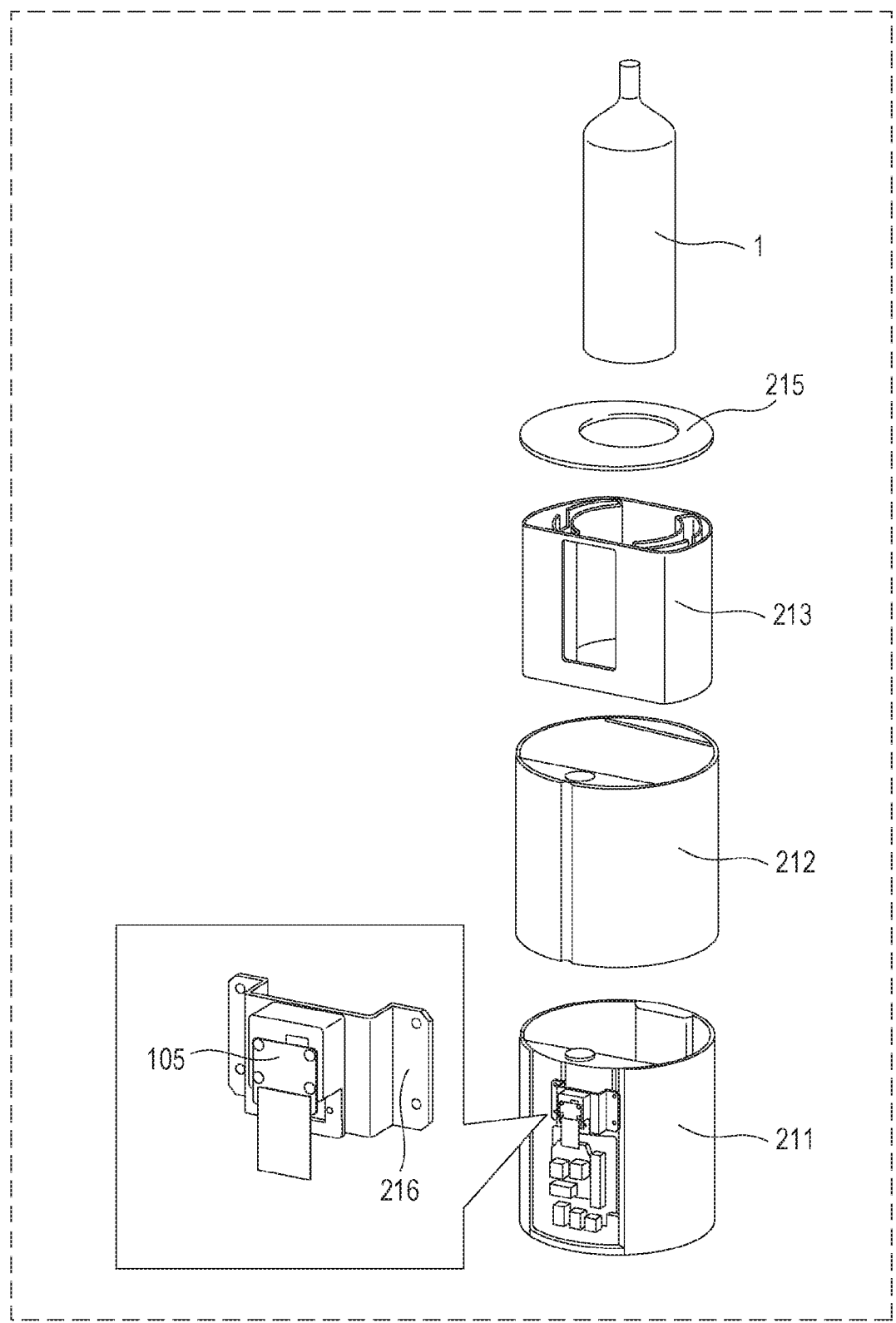
FIG. 12 is an exploded perspective view illustrating case components that constitute the bottle storage.

FIG. 12 is an exploded perspective view of case components included in the bottle storage 200. In FIG. 12, portions corresponding to those in FIG. 2 are denoted by the same reference numerals. A case 211 serves as a base for the bottle storage 200. The image capture portion 105 is attached to the case 211 with a camera holder 216 interposed therebetween. A case 212 serves as an outer casing for the bottle storage 200. A receptacle 213 is a water receptacle that receives water generated from the cooling-warming devices 104 or the like. An upper lid 215 is removably fixed to top surfaces of the cases 211 and 212, for example, by means of a magnetic force.

Figure 13:
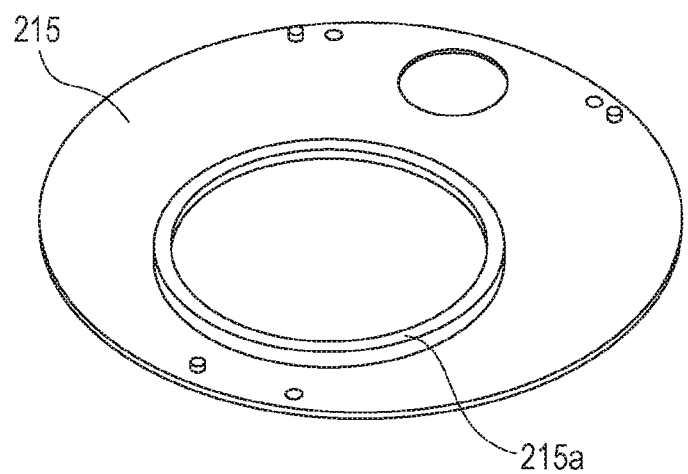
FIG. 13 is a perspective view of the upper lid, viewed from a reverse side.

FIG. 13 is a perspective view of the upper lid 215, viewed from a reverse-surface side. Unlike the bottle storage 100, the bottle storage 200 has a configuration in which the containers in the cooling-warming devices 104 are not moved in the directions in which they are close to each other and in the directions in which they are away from each other. Thus, the upper lid 215 has a simple configuration in which an annular protrusion that abuts against the inner circumferential surfaces of the containers included in the cooling-warming devices 104 is formed as a guide 215a.

Figure 14:
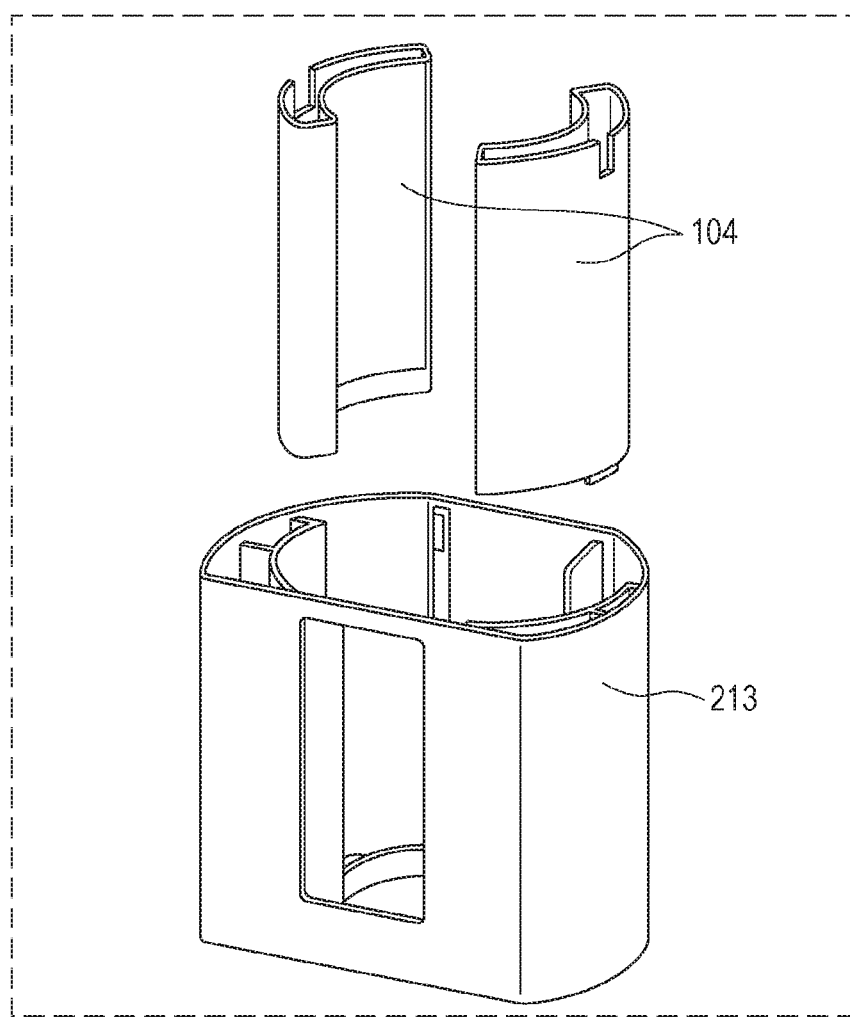
FIG. 14 is a view illustrating a state in which the cooling-warming devices are fitted into a receptacle.

Since the bottle storage 200 has a configuration in which the containers included in the cooling-warming devices 104 are not moved in the directions in which they are close to each other and in the directions in which they are away from each other, the cam box 114 like that in the bottle storage 100 can be eliminated, and thus the bottle storage 200 can be easily assembled by fitting the containers included in the cooling-warming devices 104 into the receptacle 213, as illustrated in FIG. 14.

<2> Functional Configuration of Bottle Storage

Next, a description will be given of functional configurations of the bottle storages 100 and 200. Since the functional configuration of the bottle storage 200 is simpler than the functional configuration of the bottle storage 100, the functional configuration of the bottle storage 200 will be described first, and then the functional configuration of the bottle storage 100 will be described.

<2-1> Functional Configuration of Bottle Storage 200

Figure 15:
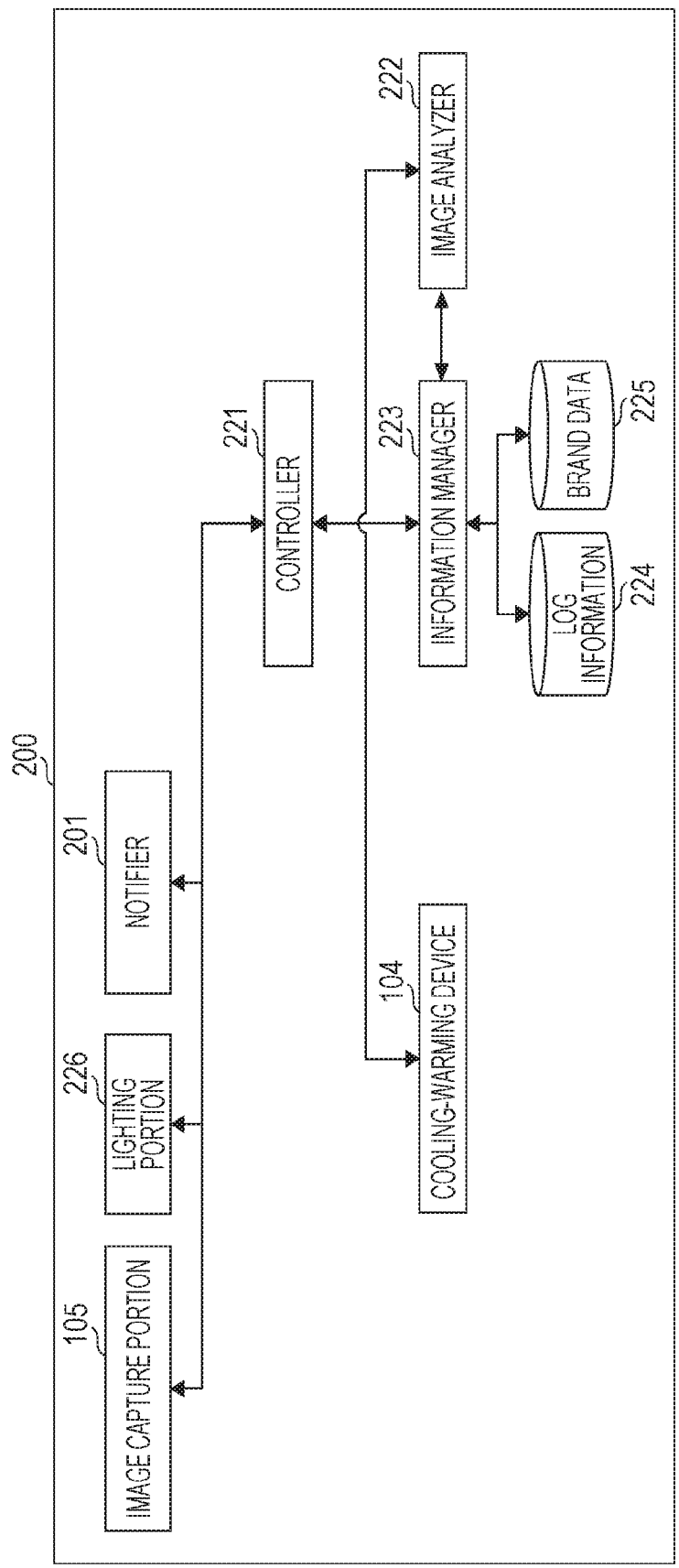
FIG. 15 is a block diagram illustrating a functional configuration of the bottle storage.

FIG. 15 is a block diagram illustrating the functional configuration of the bottle storage 200. The bottle storage 200 includes the cooling-warming devices 104, the image capture portion 105, a controller 221, an image analyzer 222, an information manager 223, a log-information storage unit (log information) 224, a brand database (brand DB) 225, the notifier 201, and a lighting portion 226.

The controller 221 controls an overall operation of the bottle storage 200. The image analyzer 222 analyzes an image captured by the image capture portion 105. The information manager 223 performs analysis and verification of a brand by using an image analysis result obtained by the image analyzer 222 and brand images stored in the brand database 225. On the basis of a verification result, the information manager 223 updates log information in a log-information storage unit 224. The controller 221 controls the notifier 201 on the basis of the verification result of the information manager 223. The lighting portion 226 illuminates the bottle 1 so that the image capture portion 105 can clearly capture an image of a bottle.

Figure 16:
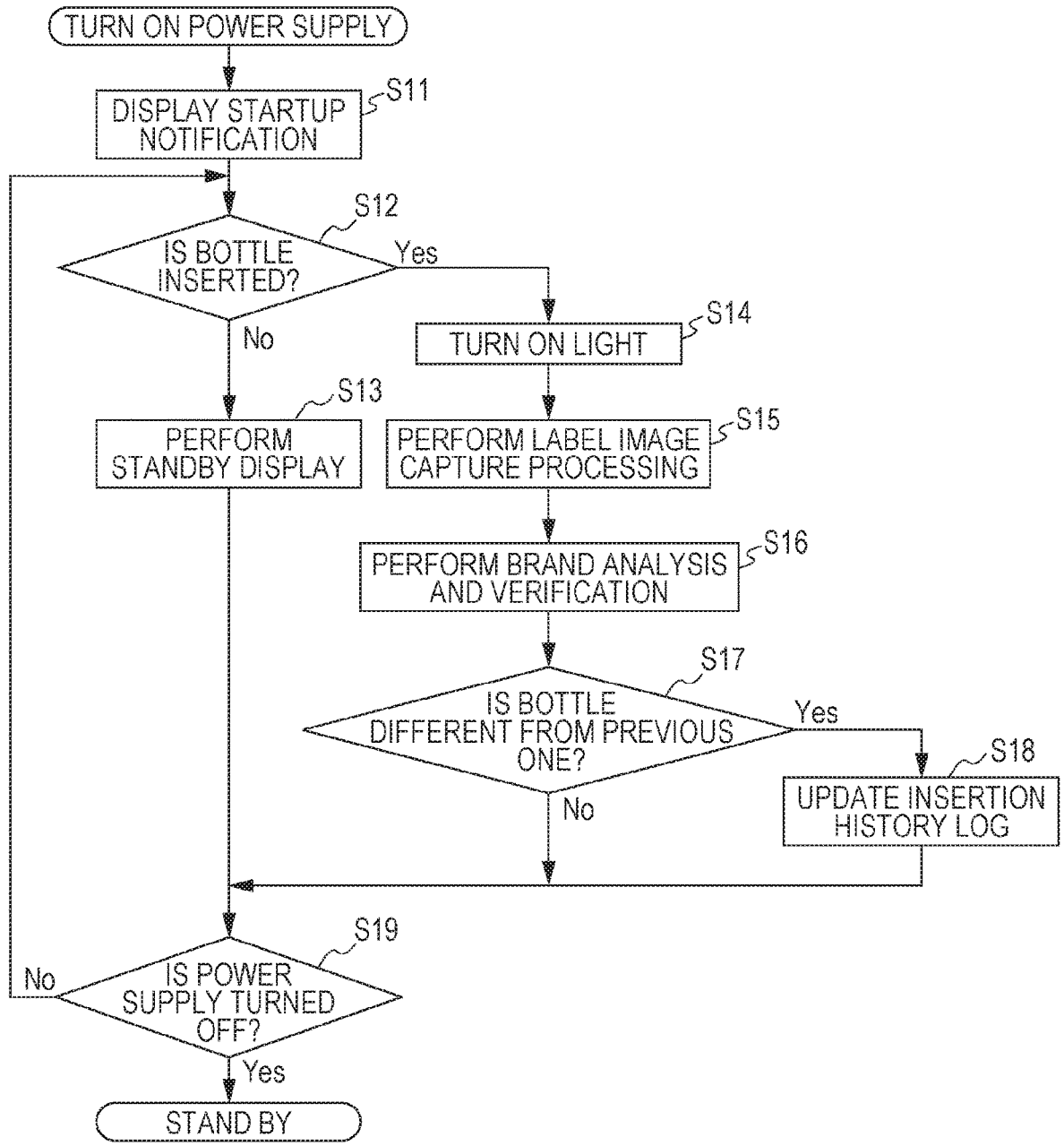
FIG. 16 is a flowchart illustrating the operation of the bottle storage.

FIG. 16 is a flowchart illustrating the operation of the bottle storage 200.

When a power supply is turned on, the controller 221 in the bottle storage 200 displays a startup notification in step S11, for example, by causing an LED in the notifier 201 to light up in predetermined color. In step S12, the controller 221 determines whether or not a bottle 1 is inserted, on the basis of an image captured by the image capture portion 105.

For example, when a weight sensor is provided on the bottle table 117, the determination as to whether or not the bottle 1 is inserted may be made using a detection result obtained by the weight sensor. If the controller 221 determines that no bottle 1 is inserted, the process proceeds to step S13 in which the controller 221 causes the notifier 201 to perform standby display indicating a state in which insertion of a bottle 1 is waited for.

On the other hand, if the controller 221 determines that the bottle 1 is inserted, the process proceeds to step S14 in which the controller 221 causes the lighting portion 226 to light. Subsequently, in step S15, the image capture portion 105 performs processing for photographing the label on the bottle 1, and in step S16, the information manager 223 performs brand analysis and verification processing. In step S17, the information manager 223 determines whether or not the bottle 1 is different from a bottle that was previously inserted. When the bottle 1 is different from the previously inserted bottle, the process proceeds to step S18 in which the information manager 223 updates an insertion history log in the log-information storage unit 224.

In step S19, the controller 221 determines whether or not the power supply is turned off, and when the power supply is not turned off, the process returns to step S12.

Figure 17A:
FIG. 17A is a view illustrating an example of a label on a bottle.
Figure 17B:
FIG. 17B is a view illustrating an example of a label on a bottle.
Figure 17C:
FIG. 17C is a view illustrating an example of a label on a bottle.
Figure 17D:
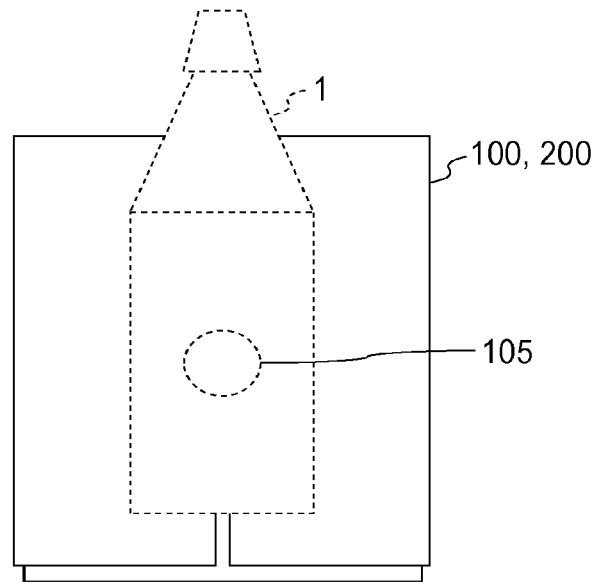
FIG. 17D is a view illustrating a positional relationship between a label and the image capture portion.

FIGS. 17A to 17D each illustrate a positional relationship between a label and the image capture portion 105 when a bottle 1 is inserted into the bottle storage 200. FIGS. 17A, 17B, and 17C each illustrate an example of a label attached to the bottle 1, and FIG. 17D illustrates a positional relationship between a label and the image capture portion 105 when the bottle 1 is housed in the bottle storage 100 or 200. As illustrated in FIG. 17D, it is desirable that the image capture portion 105 be positioned so that the image-capture center thereof is located in the vicinity of the center of the label.

Figure 18:
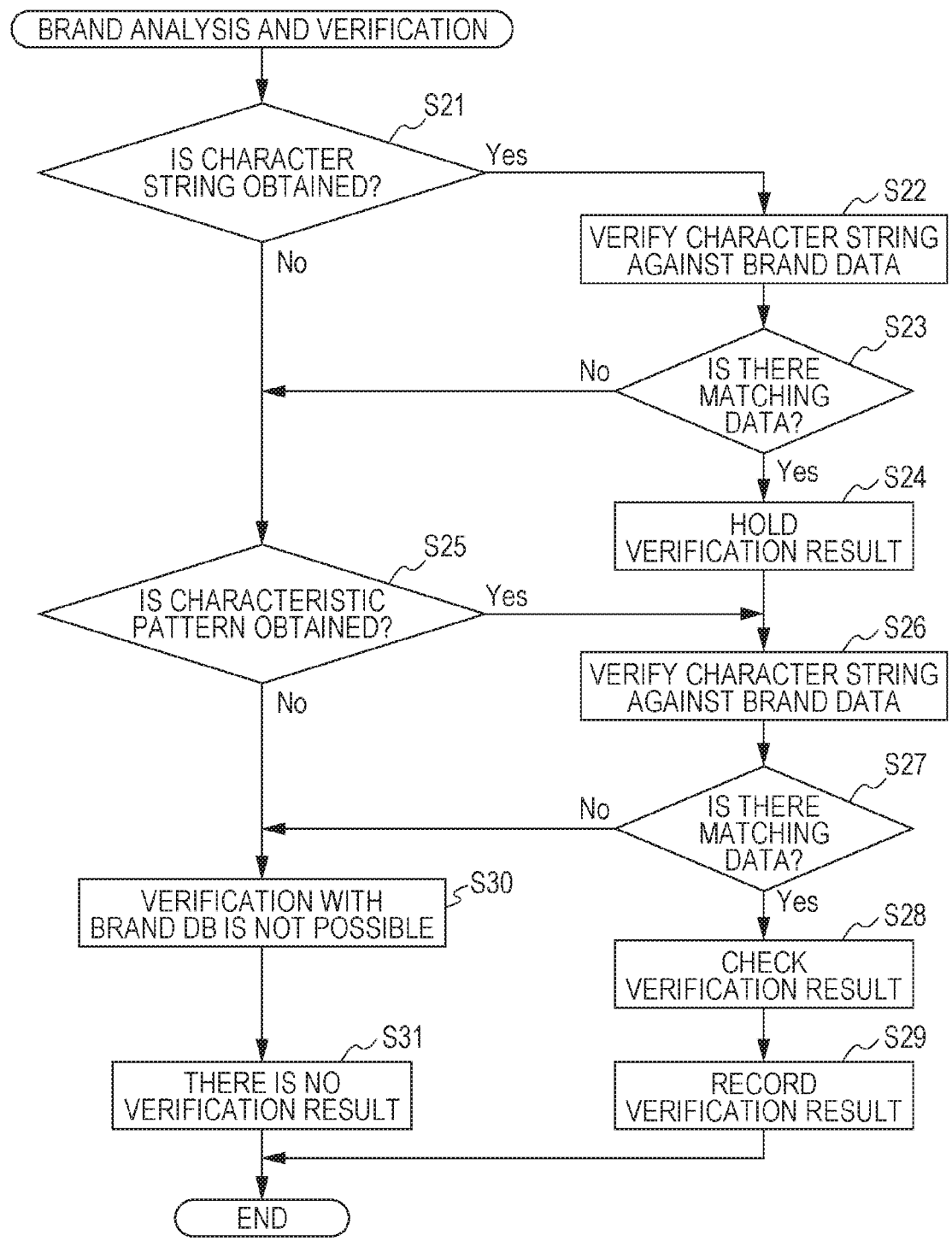
FIG. 18 is a flowchart illustrating a procedure of brand analysis and verification processing.

FIG. 18 is a flowchart illustrating a procedure of the brand analysis and the verification processing performed by the information manager 223 in step S16 in FIG. 16.

In step S21, the information manager 223 determines whether or not a character string is obtained. If the information manager 223 determines that a character string is obtained, the process proceeds to step S22 in which the information manager 223 verifies the obtained character string against brand data stored in the brand database 225. Subsequently, in step S23, the information manager 223 determines whether or not there is matching data. If there is matching data, the process proceeds to step S24 in which a verification result is held.

On the other hand, if the information manager 223 determines that no character string is obtained (No in step S21), or there is no data that matches the character string (No in step S23), the process proceeds to step S25. In step S25, the information manager 223 determines whether or not a characteristic pattern is obtained. If the information manager 223 determines that a characteristic pattern is obtained, the process proceeds to step S26 in which the information manager 223 verifies the obtained characteristic pattern against the brand data stored in the brand database 225.

Subsequently, in step S27, the information manager 223 determines whether or not there is matching data. More specifically, in step S27, the information manager 223 determines whether or not there is data that matches a character string, in addition to data that matches the characteristic pattern, that is, determines whether or not there is the verification result held in step S24. If there is data that matches at least one of the characteristic pattern and the character string, the process proceeds to step S28. In step S28, the information manager 223 checks a verification result of the characteristic pattern and the character string. In step S29, the information manager 223 records the verification result. On the other hand, if the information manager 223 determines that there is no data that matches any of the characteristic pattern and the character string (No in step S27), the process proceeds to step S30 in which the information manager 223 determines that the verification using the brand database 225 is not possible. Then, in step S31, the information manager 223 determines that there is no verification result.

Figure 19A:
FIG. 19A illustrates an image captured from the front of the bottle with a wide field of view.
Figure 19B:
FIG. 19B illustrates an image captured from the front of the bottle with a narrow field of view.
Figure 19C:
FIG. 19C illustrates an image captured from a direction that is slightly displaced from the front of the bottle.
Figure 19D:
FIG. 19D illustrates an image captured from the front of the bottle after adjusting the position of the bottle.
Figure 19E:
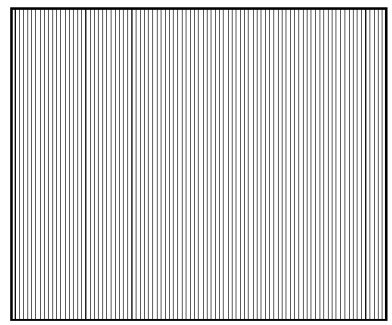
FIG. 19E illustrates a captured image of a label-less position.
Figure 19F:
FIG. 19F illustrates a captured image of a label on a rear surface of the bottle.

FIGS. 19A to 19F illustrate examples of images of the bottle 1 housed in the bottle storage 200, the images being captured by the image capture portion 105. FIG. 19A illustrates an image captured from the front of the bottle 1 with a wide field of view; FIG. 19B illustrates an image captured from the front of the bottle 1 with a narrow field of view; FIG. 19C illustrates an image captured from a direction slightly offset from the front of the bottle 1; FIG. 19D illustrates an image captured from the front of the bottle 1 after the position of the bottle 1 is adjusted by rotating the bottle table 117 (FIG. 4) from the state illustrated in FIG. 19C; FIG. 19E illustrates a captured image of a label-less position; and FIG. 19F illustrates a captured image of a label on a rear surface of the bottle 1.

Figure 20A:
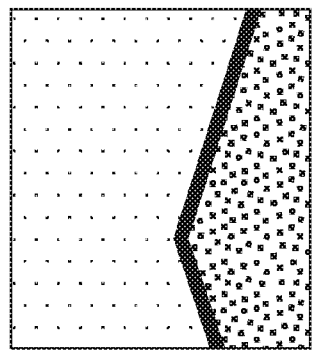
FIG. 20A illustrates an example of a captured image of a characteristic pattern.
Figure 20B:
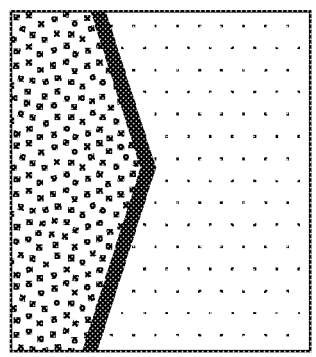
FIG. 20B illustrates an example of a captured image of a characteristic pattern.
Figure 20C:
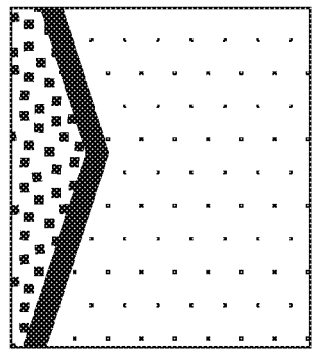
FIG. 20C illustrates an example of a captured image of a characteristic pattern.

FIGS. 20A to 20C illustrate examples of captured images of a characteristic pattern.

The captured image illustrated in FIG. 19A shows all of "SAKE", "Sakura (written in Kanji)", and "2010" as character strings and also shows a plurality of characteristic designs as a characteristic pattern, as illustrated in FIGS. 20A and 20B. Thus, the captured image illustrated in FIG. 19A can be said to be an ideal captured image. The images illustrated in FIGS. 19B and 19D show "Sakura (written in Kanji)" and "2010", which are character strings, and shows a characteristic design as a characteristic pattern, as illustrated in FIG. 20C.

FIG. 21 illustrates one example of an information table stored in the brand database 225. Information about brand types, content identifiers (CIDs), brand names, brewer information, retailers, and so on is stored in association with character strings and characteristic patterns, which are determination information. Thus, by using the brand database 225, the information manager 223 can read information about the brand type, the CID, the brand name, the brewer information, the retailers, and so on the basis of the verified character string and characteristic pattern.

FIG. 22 illustrates one example of a bottle-insertion history log stored in the log-information storage unit 224. The bottle-insertion history log may be recorded, for example, when a bottle is inserted or when a predetermined time passes (e.g., every 10 minutes). The bottle-insertion history log includes, dates, times, content identifiers (CIDs), degrees of certainty, drinking records, and so on. The degree of certainty is a likelihood in the verification performed by the information manager 223. When the degree of certainty is higher than or equal to a predetermined threshold, "true" is recorded as the drinking record, and when the degree of certainty is lower than the predetermined threshold, "false" is record. The bottle storage 200 can record, in the bottle-insertion history log, a frequency of insertion of the bottle 1 indicated by a content ID (i.e., a frequency of drinking of a beverage) and the time when a bottle 1 with the content ID is replaced with a bottle 1 with another content ID, and can inform the user of these pieces of information by giving a notification or displaying these pieces of information.

<2-2> Functional Configuration of Bottle Storage 100

Figure 23:
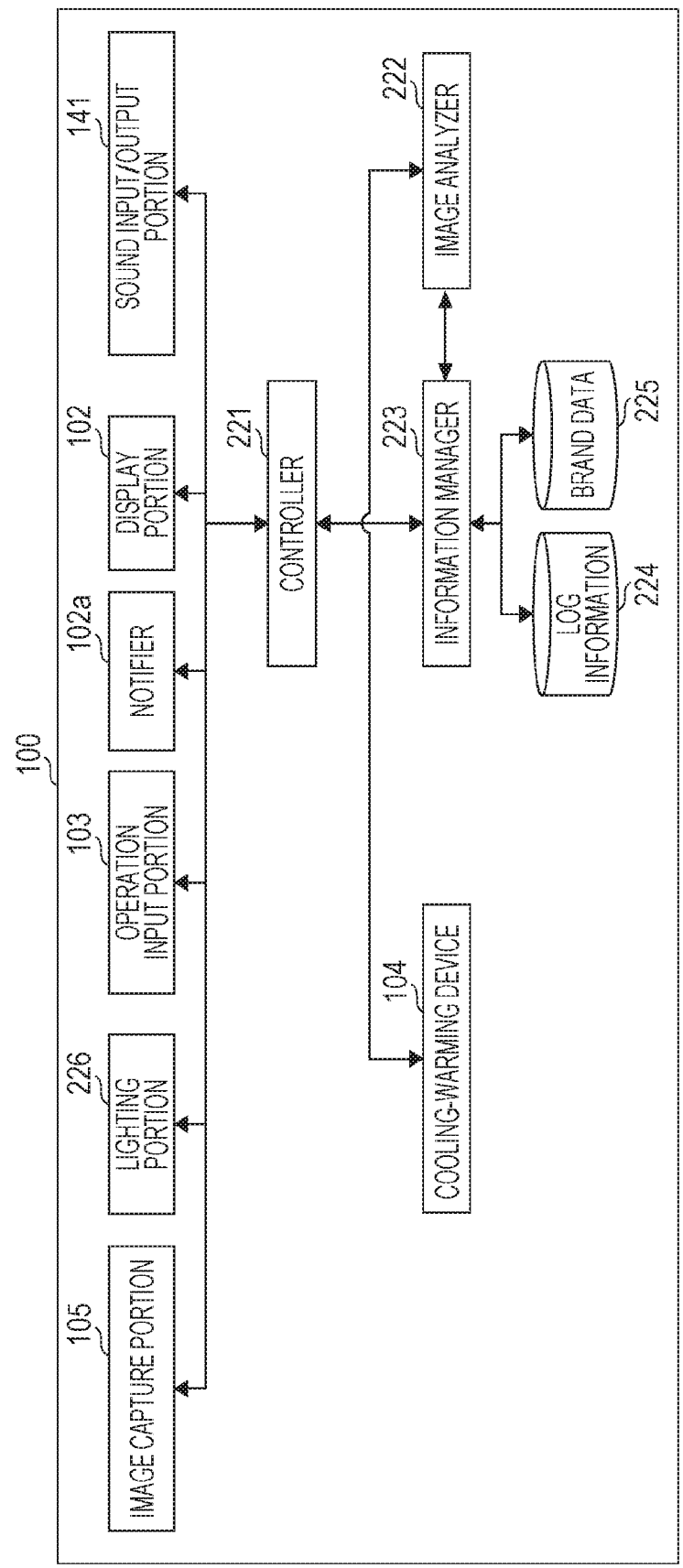
FIG. 23 is a block diagram illustrating a functional configuration of the bottle storage.

FIG. 23 is a block diagram illustrating the functional configuration of the bottle storage 100. In FIG. 23, portions corresponding to those in FIG. 15 are denoted by the same reference numerals. The bottle storage 100 includes the operation input portion 103, the display portion 102, and a sound input/output portion 141, in addition to the configuration of the bottle storage 200. Although, in practice, the bottle storage 200 also includes the operation input portion 103, the operation input portion 103 was omitted for ease of description in FIG. 15. The bottle storage 200 may also include a sound input/output portion 141. A major difference between the bottle storages 100 and 200 is that the bottle storage 100 includes the display portion 102, including a liquid-crystal display or the like.

FIG. 24 illustrates an example of external notifications given by the bottle storage 100. The bottle storage 100 issues an external notification indicating an operation state thereof by means of light using an LED (the notifier 102a), display using a liquid-crystal display (the display portion 102), and sound output (the sound input/output portion 141). In FIG. 24, pieces of information in each row are associated to each other. For example, during startup, the LED lights up in white, the liquid-crystal display displays a startup logo, and the sound input/output portion 141 outputs a startup sound. When the insertion of the bottle 1 is waited for, the LED lights up in blue, the liquid-crystal display displays a standby list, and the sound input/output portion 141 outputs a standby sound.

Figure 25:
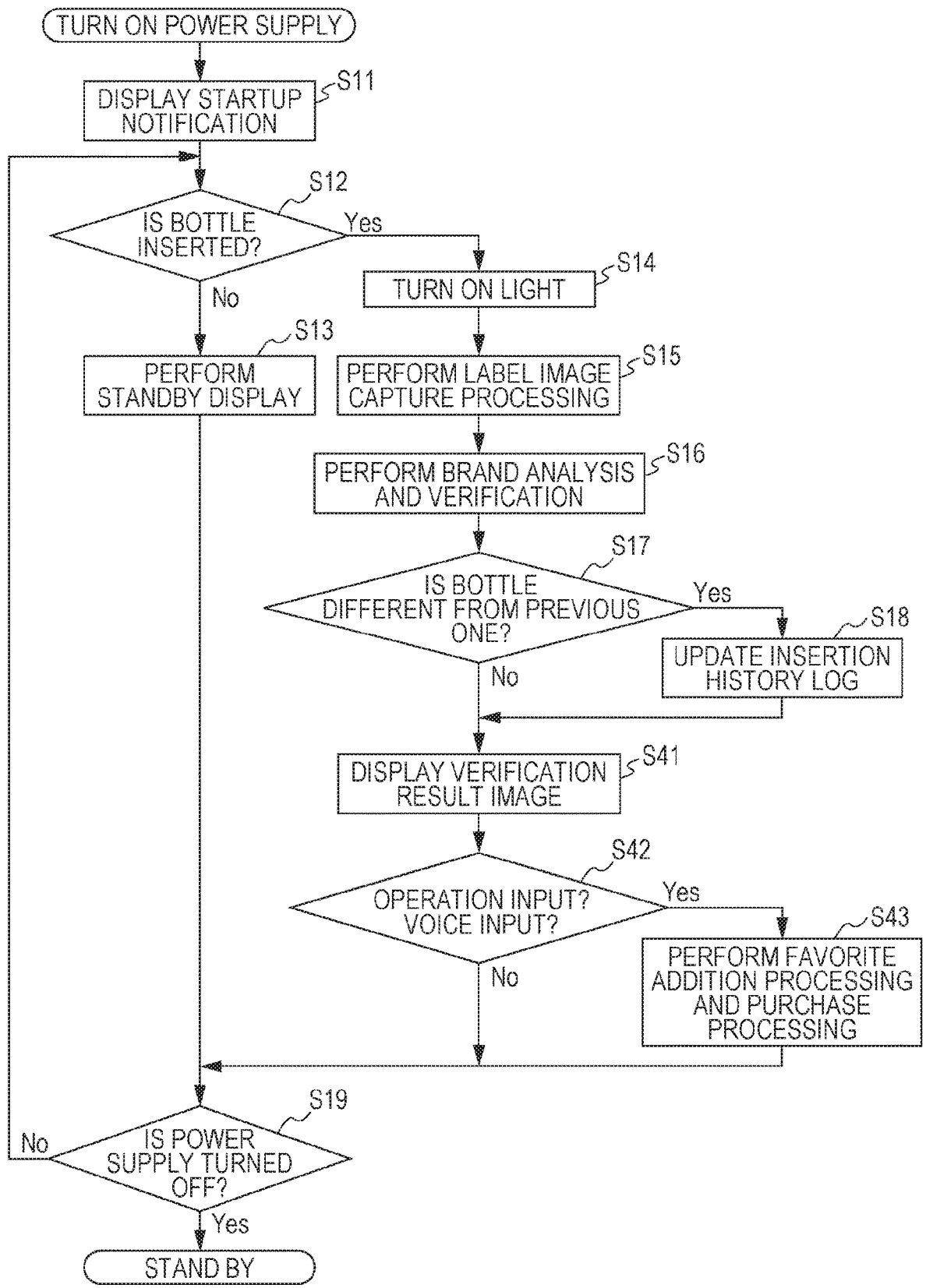
FIG. 25 is a flowchart illustrating the operation of the bottle storage.

FIG. 25 is a flowchart illustrating the operation of the bottle storage 100. In FIG. 25, portions corresponding to those in FIG. 16 are denoted by the same reference numerals. Only processes that differ from those in FIG. 16 will be described below. In step S41, the bottle storage 100 displays, on the display portion 102, an image indicating a verification result. Also, in step S42, the controller 221 in the bottle storage 100 determines whether or not an operation input from the operation input portion 103 or a voice input from the sound input/output portion 141 is received. If any of the inputs is received, the process proceeds to step S43. In step S43, favorite addition processing and purchase processing are performed. For example, the larger the number of times the electrostatic button included in the operation input portion 103 is, the higher the favorite level is when a brand is added as a favorite.

FIG. 26 illustrates examples of images displayed by the display portion 102. The images illustrated in FIG. 26 are pre-stored, for example, in the brand database 225. Specifically, a general label, a particular label, a food that goes well, a taste chart, brewery information, a menu in a restaurant/bar, and so on, which correspond to each content ID (CID) is stored. Information corresponding to a content ID indicated by a verification result is displayed on the display portion 102. The "particular label" is, for example, an image or the like of a label that is highly effective in advertisement, the label being provided by a purchaser in advance. The "food that goes well" is an image showing a food that goes well with the beverage indicated by the content ID. The "taste chart" is an image showing the taste of the beverage indicated by the content ID. The "brewery information" is represented by an image showing the face of a corresponding brewer, a region, or the like. The "menu at a restaurant/bar" is an image of a dish that goes well with the beverage indicated by the content ID, when the bottle storage 100 is used at a particular restaurant/bar.

Thus, since various types of information about the inserted bottle 1 are displayed on the display portion 102 in the bottle storage 100 in the present embodiment, the user can more enjoy drinking. In addition, since information that goes well with the bottled beverages is displayed, demands for not only bottled beverages but also foods are also aroused. Hence, when the bottle storage 100 in the present embodiment is used at a restaurant or the like, this leads to an increase in sales of dishes. Information that is the same as information displayed as an image on the display portion 102 may be output from the sound input/output portion 141 by means of sound.

FIG. 27A illustrates an example of a verification result image displayed by the display portion 102 in step S41. In the example illustrated in FIG. 27A, the current time "20:06", a favorite level (the number of stars) registered previously, and so on are displayed in conjunction with an image of a label that was authenticated by the verification. In the case of the bottle storage 200 (FIGS. 11 and 11B) that lacks the display portion 102 and has only the notifier 201, the LED included in the notifier 201 may be made to light up in a particular color indicating that the verification was performed, as illustrated in FIG. 27B.

FIG. 28 illustrates an example of a table obtained by favorite addition processing. The table illustrated in FIG. 28 is stored in the log-information storage unit 224. The illustrated table is created for each user ID (UID). Registration times at which favorites were added, favorite levels, and cumulative determination counts are record for respective content IDs (C11, C12, . . . ). Each cumulative determination count indicates the number of times the brand corresponding to the content ID was added as a favorite.

Figure 29A:
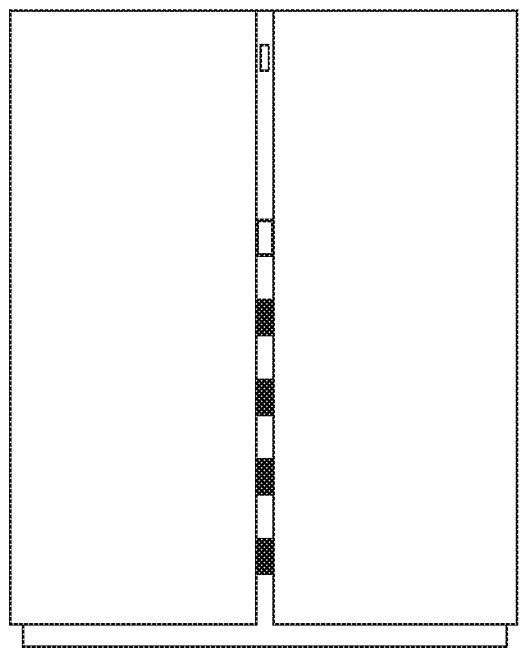
FIG. 29A is a view illustrating an example in which LEDs whose number corresponds to a favorite level are made to light up.
Figure 29B:
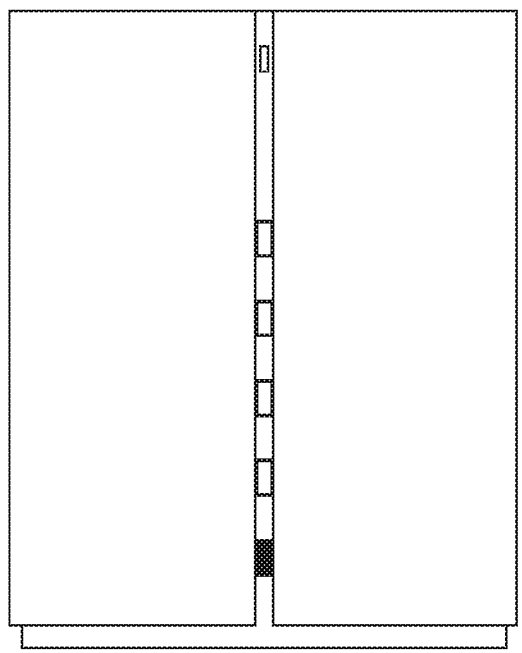
FIG. 29B is a view illustrating an example in which LEDs whose number corresponds to the favorite level are made to light up.

In the case of the bottle storage 100 having the display portion 102, including a liquid-crystal display or the like, it is possible to display a favorite level in the form of an image, as illustrated in FIG. 27A. On the other hand, in the case of the bottle storage 200 that lacks the display portion 102 and that has the notifier 201 including a plurality of LEDs, it is possible to inform the user of a favorite level by causing a number of LEDs whose number corresponds to the favorite level to light up, as illustrated in FIGS. 29A and 29B.

Although, in the present embodiment, the favorite level is determined according to the number of times the user presses the operation input portion 103, for example, the favorite level may be determined based on the number of times the content ID of a bottle is inserted into the bottle storage 100. That is, since the number of times a favorite beverage (bottle) is inserted into the bottle storage 100 also tends to increase, the favorite level may be determined based on the number of times a favorite beverage (bottle) is inserted. Also, the favorite level may be determined comprehensively considering the number of times the operation input portion 103 is pressed and the number of times a bottle is inserted.

Figure 30:
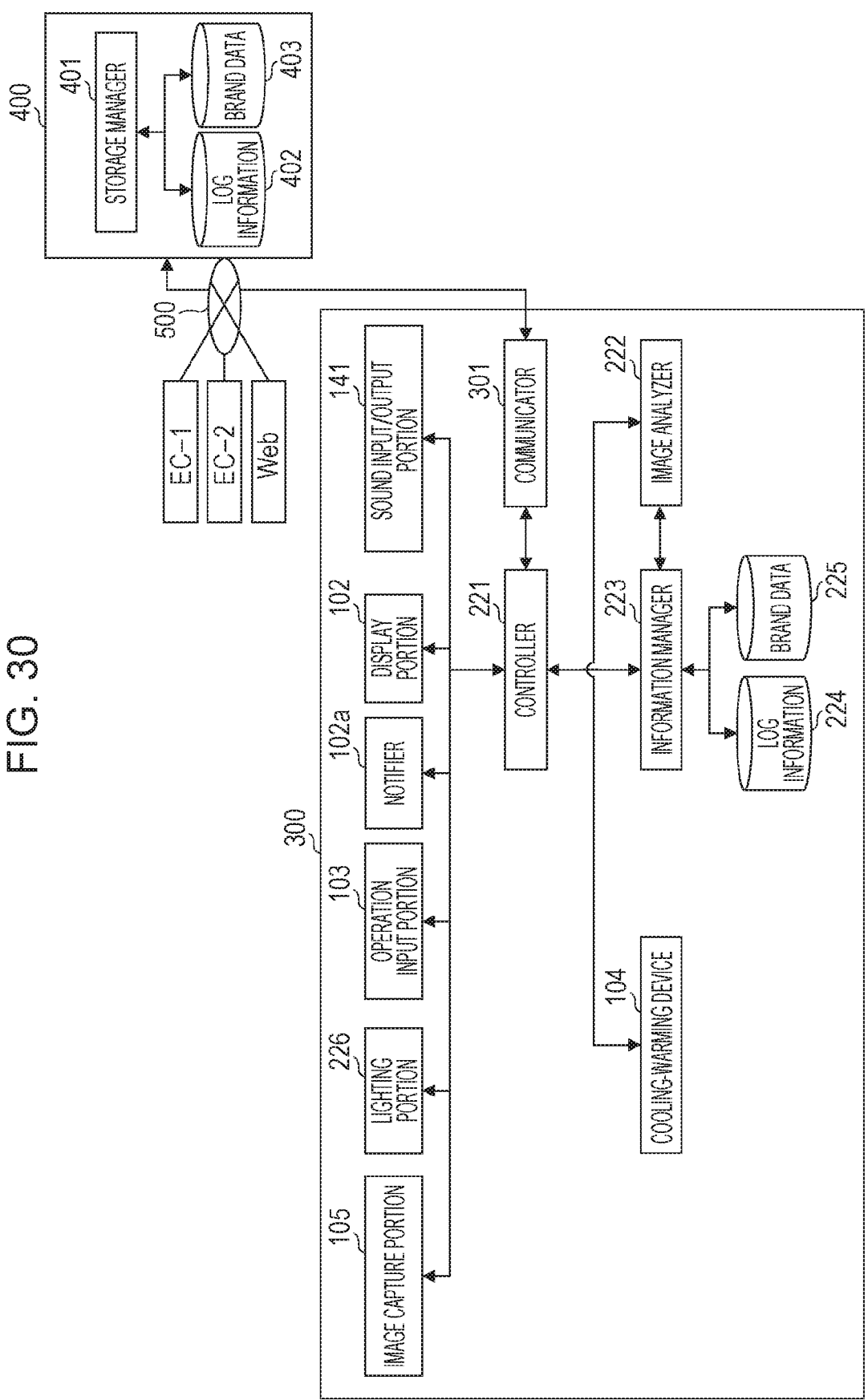
FIG. 30 is a block diagram illustrating a functional configuration of a bottle storage having a function for communicating with an external device.

<2-3> Functional Configuration of Bottle Storage Having Function for Communicating with Outside Device FIG. 30 is a block diagram illustrating a functional configuration of a bottle storage 300 having a communication function with an outside device. In FIG. 30, portions corresponding to those in FIG. 23 are denoted by the same reference numerals. The bottle storage 300 has a communicator 301 in addition to the functions of the bottle storage 100 illustrated in FIG. 23. The communicator 301 can communicate with a cloud server 400 over an Internet 500.

The cloud server 400 includes a storage manager 401, a log-information storage unit 402, and a brand database 403. The cloud server 400 can communicate with a plurality of bottle storages, can record log information of the bottle storages in the log-information storage unit 402, and can store a large amount of brand data in the brand database 403. That is, the log-information storage unit 402 and the brand database 403 in the cloud server 400 can store a larger amount of data than the log-information storage unit 224 and the brand database 225 in the bottle storage 300. The cloud server 400 and the bottle storage 300 have a relationship between a master and a slave.

When no verification result is obtained by verification using the brand database 225, the bottle storage 300 issues a request for verification to the cloud server 400 via the communicator 301. In this case, the bottle storage 300 transmits a captured image to be verified or an image analysis result to the cloud server 400. The storage manager 401 in the cloud server 400 verifies an image analysis result based on the transmitted captured image or the transmitted image analysis result against images stored in the brand database 403 and transmits a verification result to the bottle storage 300. This makes it possible to perform verification using a larger number of label images than the number of label images stored in the brand database 225 in the bottle storage 300, thus increasing the possibility that a label image that matches a captured label image is found. Also, since the cloud server 400 can store therein a larger amount of information associated with content IDs obtained via the verification, it is possible to increase the amount of information that can be output by the bottle storage 300 by means of images or sound.

Without the provision of the log-information storage unit 224 and the brand database 225 in the bottle storage 300, the cloud server 400 may perform all the verification processing, the log-information storage processing, and so on. Search for a label image that matches the captured label image and search for information corresponding to a content ID may be performed using not only the cloud server 400 but also an Internet space including the cloud server 400.

Figure 31:
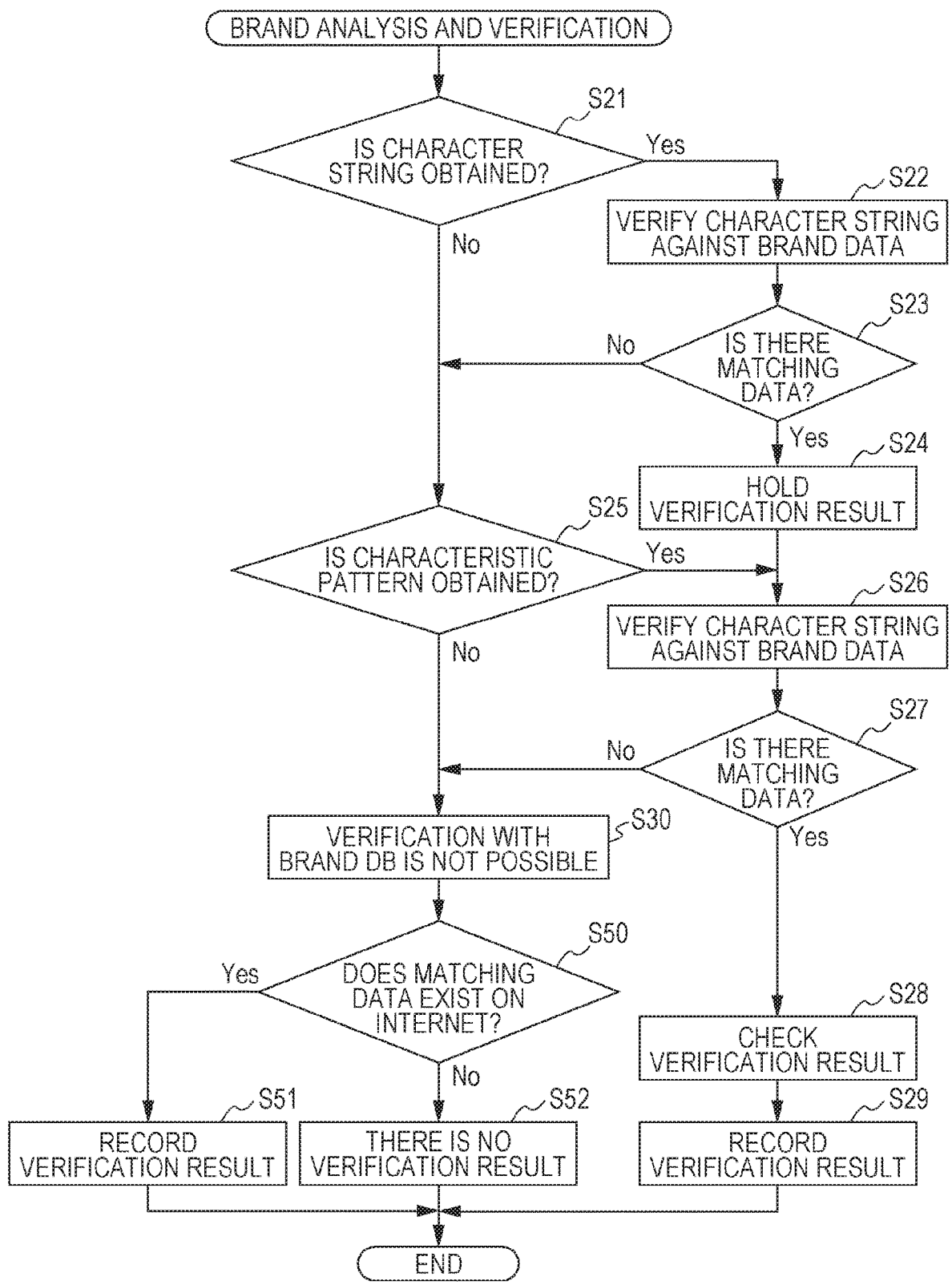
FIG. 31 is a flowchart illustrating a procedure for brand analysis and verification processing performed by the bottle storage having the communication function.

FIG. 31 is a flowchart illustrating a procedure for brand analysis and verification processing performed by the information manager 223 in the bottle storage 300 having the communication function. In FIG. 31, portions corresponding to those illustrated in FIG. 18 are denoted by the same reference numerals. Only a procedure that is different from those in FIG. 18 will be described below. If the information manager 223 determines that verification using the brand database 225 is not possible in step S30, the process proceeds to step S50. In step S50, the information manager 223 determines whether or not image data that matches the captured character string and characteristic pattern exists in the Internet space including the cloud server 400. When matching image data exists, the process proceeds to step S51 in which the information manager 223 records the search result (i.e., the matching image data) in the brand database 403, and when the matching image data does not exist, the process proceeds to step S52, in which the information manager 223 determines that there is no verification result.

<2-4> Cooperation with Information Device

Figure 32:
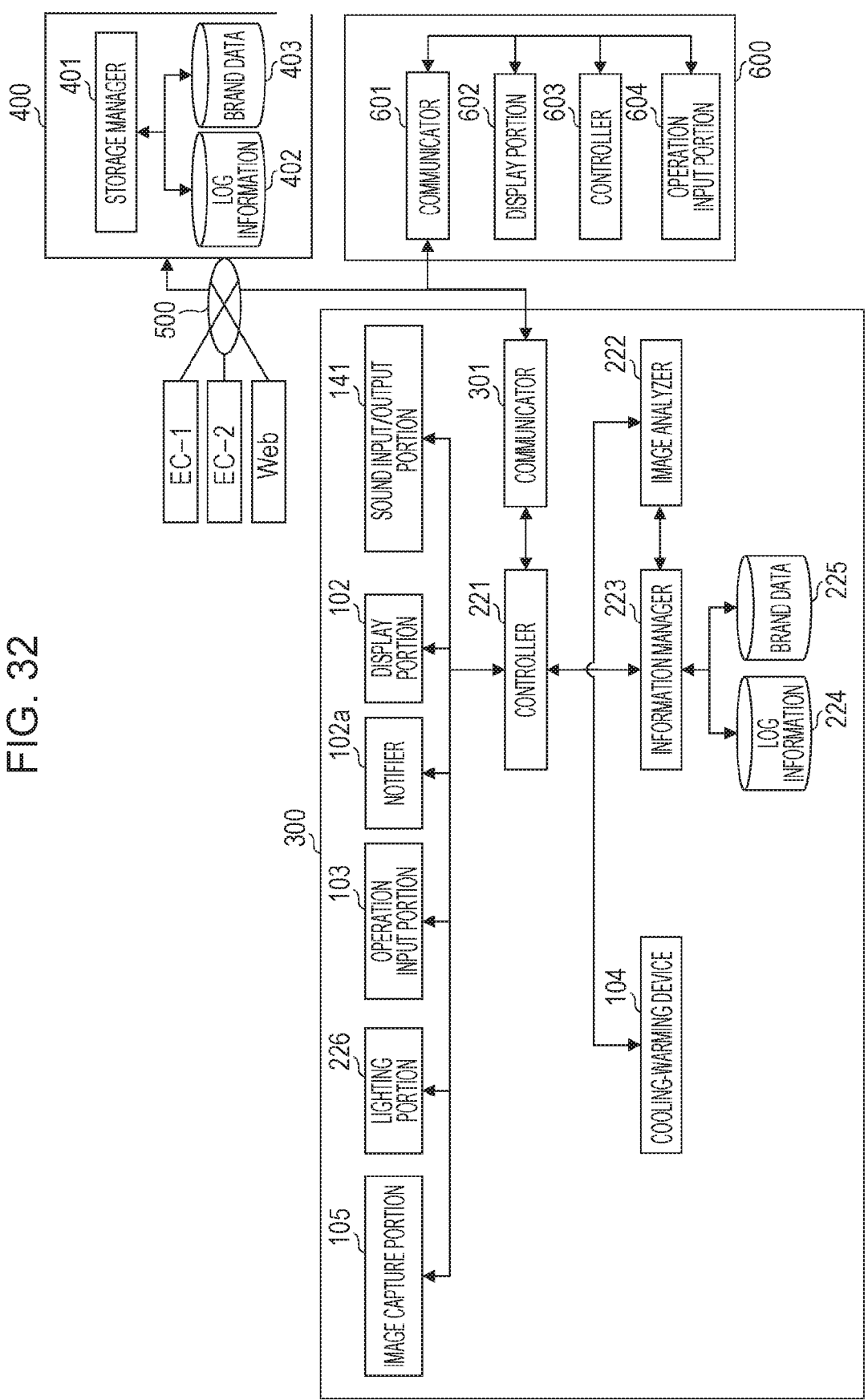
FIG. 32 is a block diagram illustrating a system configuration in which the bottle storage can communicate with an information device, such as a smartphone, via a communicator.

FIG. 32 is a block diagram illustrating a system configuration in which the bottle storage 300 can communicate with an information device 600, such as a smartphone, via the communicator 301. In FIG. 32, portions corresponding to those illustrated in FIG. 30 are denoted by same reference numerals. The information device 600 includes a communicator 601, a display portion 602, a controller 603, and an operation input portion 604.

In the system illustrated in FIG. 32, the information device 600 can access the bottle storage 300 to read the log information stored in the log-information storage unit 224 in the bottle storage 300 and can display the read log information on the display portion 602. This allows the user to display, on the information device 600, information he or she wishes to view among information stored in the bottle storage 300, independently from the information displayed on the display portion 102 on the bottle storage 300.

Also, even with the bottle storage 200 that lacks the display portion 102, such as a liquid-crystal display, when a communicator that can communicate with the information device 600 is provided, information stored in the bottle storage 200 can be displayed on the display portion 602 of the information device 600, as illustrated in FIG. 33.

FIG. 34 illustrates the contents of a favorite table that is stored in the log-information storage unit 224 when cooperation with the information device 600 is performed. Information about an access history and a purchase log, in addition to the information illustrated in FIG. 28, are recorded in the favorite table. In the example illustrated in FIG. 34, information indicating that a user "user ID=001" purchased two bottles "content ID=C12" from a retailer "EC-2 (electronic commerce-2)" is recorded.

<2-5> Functional Configuration of Bottle Storage Having Rotation Mechanism and Raising-and-Lowering Mechanism The bottle storage 100 that is capable of capturing images of the bottle 1 from various angles by rotating the bottle table 117 has been described above with reference to FIG. 4.

Figure 35:
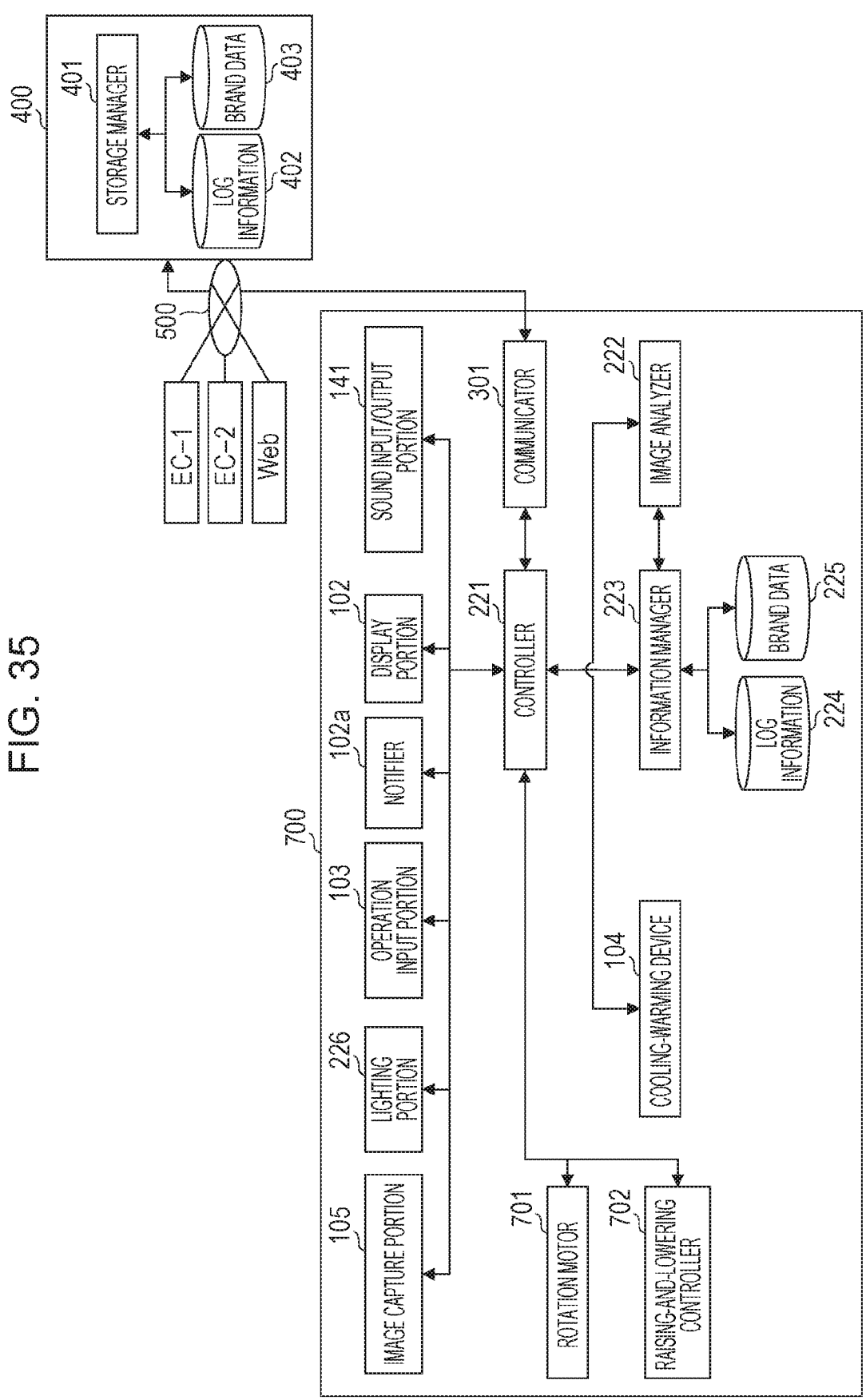
FIG. 35 is a block diagram illustrating a functional configuration of a bottle storage having a function for rotating the bottle table and a function for raising and lowering the bottle table.

FIG. 35 is a block diagram illustrating a functional configuration of a bottle storage 700 having a function for rotating the bottle table 117 and a function for raising and lowering the bottle table 117. In FIG. 35, portions corresponding to those illustrated in FIG. 30 are denoted by the same reference numerals. The bottle storage 700 has a raising-and-lowering mechanism for raising and lowering the bottle table 117 in addition to a rotation mechanism for rotating the bottle table 117 which is similar to the bottle storage 100. In the bottle storage 700, the controller 221 controls a rotation motor 701 and also controls a raising-and-lowering controller 702.

Figure 36:
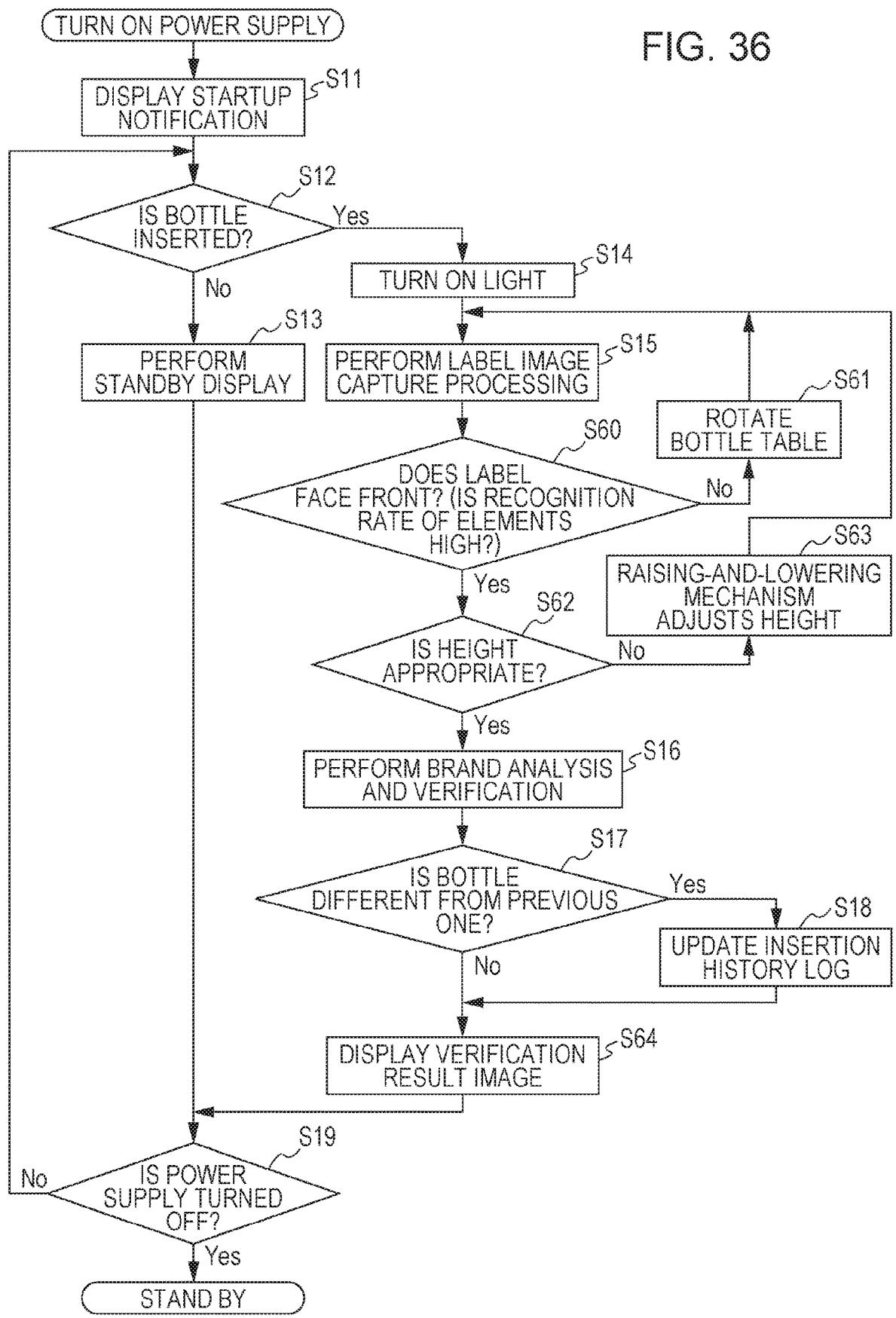
FIG. 36 is a flowchart illustrating the operation of the bottle storage.

FIG. 36 is a flowchart illustrating the operation of the bottle storage 700. In FIG. 36, portions corresponding to those illustrated in FIG. 16 are denoted by the same reference numerals. In the processing in FIG. 36, processes in steps S60 to S64 are added to the processing in FIG. 16, and thus the processes in steps S60 to S64 will be described below.

In step S60, the controller 221 determines whether or not the label faces the front (i.e., whether or not the label faces in the direction of the image capture portion 105) on the basis of the analysis result obtained by the image analyzer 222. More specifically, the image analyzer 222 determines how the label is shown in the image. More specifically, the image analyzer 222 determines whether or not the label is shown in the image of the bottle to a degree that the brand of the bottle can be identified. This determination can be made, for example, based on whether or not the recognition rate of elements is high or based on edges of the label. If the controller 221 determines in step S60 that the label does not face the front, the process proceeds to step S61. In step S61, the controller 221 causes the rotation motor 701 to operate to thereby rotate the bottle table 117 by a predetermined angle. Thereafter, in step S15, the image capture portion 105 performs label image-capture processing again. The controller 221 repeats the processes in steps S15, S60, and S61 until it determines that the label faces the front.

The bottle storage 700 may capture images while rotating the bottle. For example, the bottle storage 700 may rotate the bottle to a pre-set angle and capture an image of the bottle each time the bottle is rotated by a predetermined angle, regardless of whether or not the label is recognized. The bottle storage 700 may also control the rotation direction in accordance with a recognized label portion. For example, when a right end of the label is recognized, the bottle storage 700 may rotate the bottle counterclockwise.

If the controller 221 determines that the label faces the front in step S60, the process proceeds to step S62. In step S62, the controller 221 determines whether or not the height of the label is appropriate. Specifically, the image analyzer 222 determines how the label is shown in the image. More specifically, the image analyzer 222 determines whether or not the label is shown in the image of the bottle to a degree that the brand of the bottle can be identified. This determination can also be made, for example, based on whether or not the recognition rate of elements is high or based on edges of the label. If the controller 221 determines that the height of the label is not appropriate in step S62, the process proceeds to step S63. In step S63, the raising-and-lowering controller 702 and the raising-and-lowering mechanism adjust the height of the bottle table 117. Thereafter, in step S15, the image capture portion 105 performs the label image-capture processing. The controller 221 repeats the processes in steps S15, S60, S62, and S63 until it determines that the height of the label is appropriate. In step S64, the bottle storage 700 displays a verification result image.

The bottle storage 700 may capture images while raising or lowering the bottle. For example, the bottle storage 700 may raise or lower the bottle to a pre-set height and capture an image each time the bottle is raised or lowered by a predetermined height, regardless of whether or not the label is recognized. The bottle storage 700 may control the raising-or-lowering direction in accordance with a recognized label. For example, the bottle storage 700 may raise the bottle when an upper end of the label is recognized.

When labels are attached to a plurality of positions of the bottle 1, the rotation and the raising-and-lowering make it possible to capture images of the plurality of labels.

The bottle storage 700 may output information for prompting the user to rotate the bottle, instead of or in conjunction with rotating the bottle. For example, the bottle storage 700 may display, on the display portion 102, an image for prompting the user to rotate the bottle. The bottle storage 700 may also display, on the display portion 102, the image in accordance with a recognized label portion. For example, when a right end of the label is recognized, the bottle storage 700 may display, on the display portion 102, an image for prompting the user to rotate the bottle counterclockwise. The notifier 201 may notify the user of information for prompting the user to rotate the bottle.

<3> Another Example Configuration of Bottle Storage

<3-1>

Figure 37A:
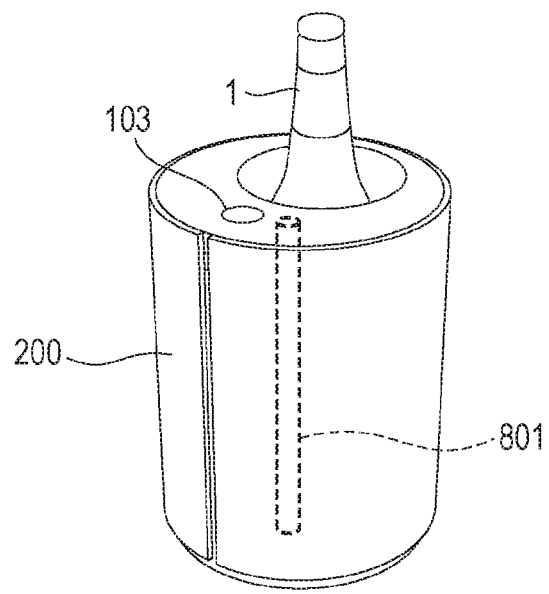
FIG. 37A is an external perspective view of an example in which a bottle storage includes a scanner.
Figure 37B:
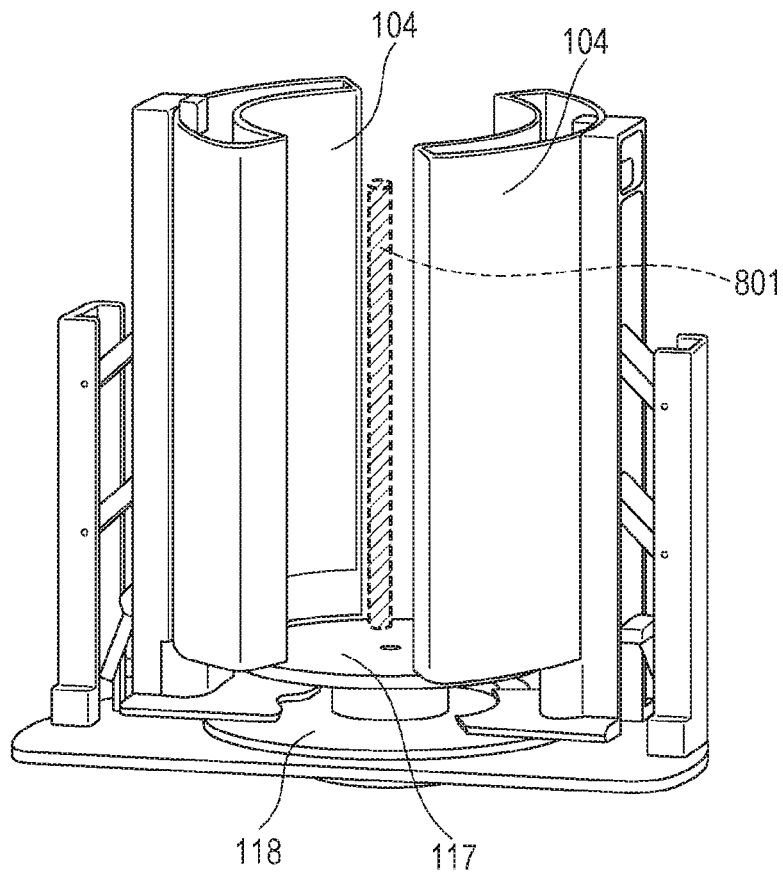
FIG. 37B is a perspective view illustrating an internal state of an example in which the bottle storage includes the scanner.

Although a case in which the image capture portion 105, including a camera, captures an image of a label has been described in the above embodiment, the image capture portion 105 is not limited to a camera and may be implemented by a scanner. FIGS. 37A and 37B illustrate an example of a configuration including a scanner. FIG. 37A is a perspective view illustrating an example in which the bottle storage 200 includes a scanner 801, and FIG. 37B is a perspective view illustrating an internal state of the bottle storage 200 when it includes the scanner 801. That is, the scanner 801, which is vertically long, is provided along the bottle 1. When the bottle 1 or the scanner 801 is rotated, a label can be read.

Figure 38:
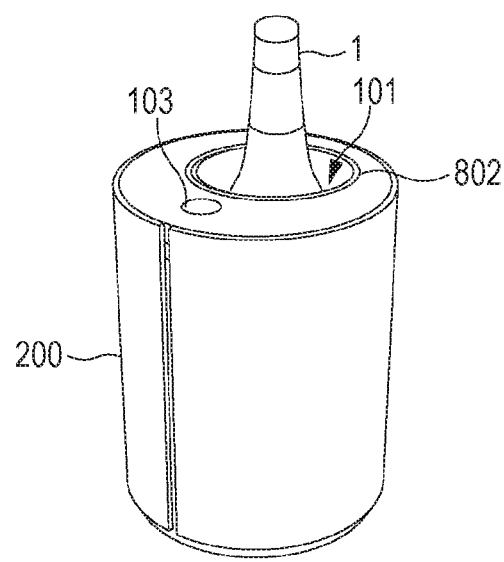
FIG. 38 is an external perspective view illustrating an example in which an annular scanner is provided in the opening portion in a housing portion for a bottle.

As illustrated in FIG. 38, an annular scanner 802 may be provided in the opening portion in the housing portion 101 for a bottle. This makes it possible to read an image of a label when the bottle 1 is inserted into the bottle storage 200.

<3-2>

Figure 39A:
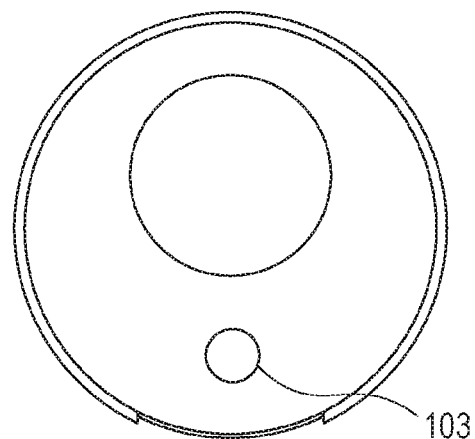
FIG. 39A is a top view illustrating a typical electrostatic button.
Figure 39B:
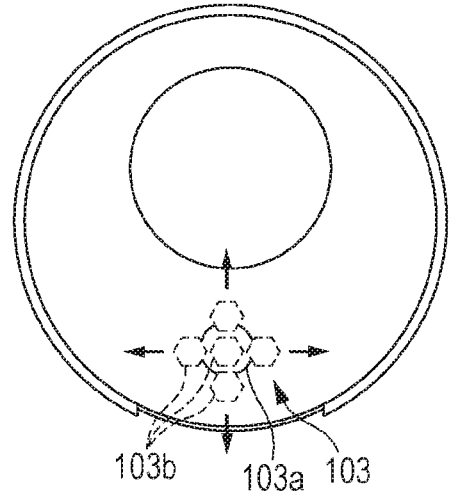
FIG. 39B is a top view illustrating an electrostatic button having a configuration in which capacitive sensors are disposed on the reverse side of a button in the shape of a cross.

The description in the above embodiment has been given of a case in which the operation input portion 103, including an electrostatic button or the like, is provided as illustrated in FIG. 39A, and for example, the favorite level or the like is input based on the number of times the operation input portion 103 is pressed. Capacitive sensors 103b may be disposed on the reverse side of a button 103a in the shape of a cross to detect a user operation to the upper, lower, left, or right side, as illustrated in FIG. 39B, so as to enable selection of an image displayed on the display portion 102. This allow the user to select an image he or she wishes to view. When the display portion 102 is a touch-panel display, the image selection may be performed by an operation of touching the display portion 102. That is, the display portion 102 may also have the function of the operation input portion 103.

<3-3>

When a rotation mechanism, such as bottle table 117 and the motor, for rotating the bottle 1 is provided, information indicating that the bottle 1 was rotated may be recorded as a log. FIG. 40 illustrates an example in which rotation information is further added to the insertion history log. By viewing the insertion history log in FIG. 40, it is possible to know that a back label was photographed by rotating the bottle 1 and the date and time of the photography.

<3-4>

Figure 41:
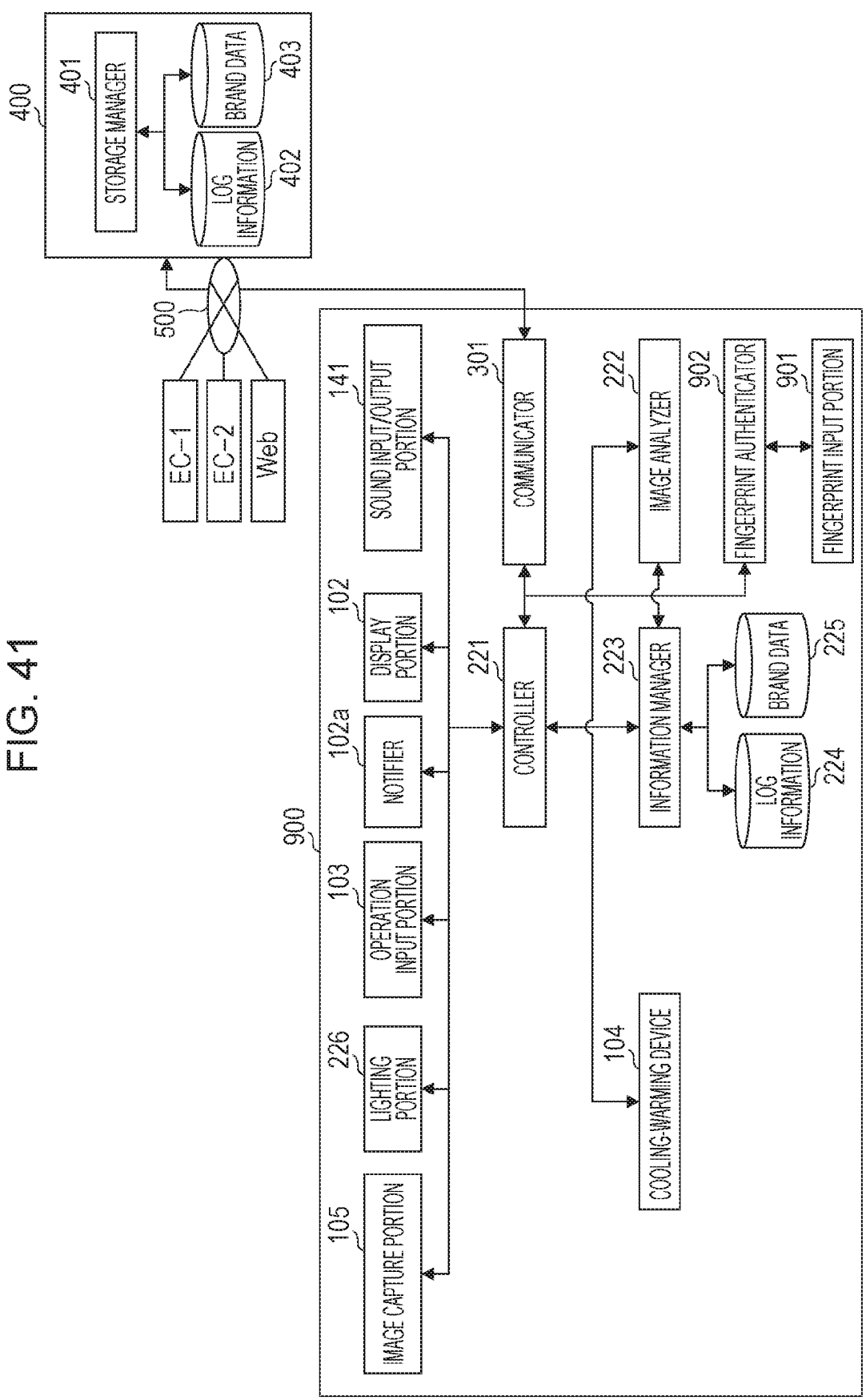
FIG. 41 is block diagram illustrating a functional configuration of a bottle storage that can perform personal authentication.

FIG. 41 is a block diagram illustrating a functional configuration of a bottle storage 900 that can perform personal authentication. In FIG. 41, portions corresponding to those illustrated in FIG. 30 are denoted by the same reference numerals. The bottle storage 900 has a fingerprint input portion 901 and a fingerprint authenticator 902, in addition to the functions of the bottle storage 300 illustrated in FIG. 30. With this configuration, the bottle storage 900 can identify a user, thus allowing the controller 221 to display, for example, recommended information associated with the identified user. In addition, after the authentication is performed, it is possible to purchase a product over the Internet 500 or the like.

Figure 42A:
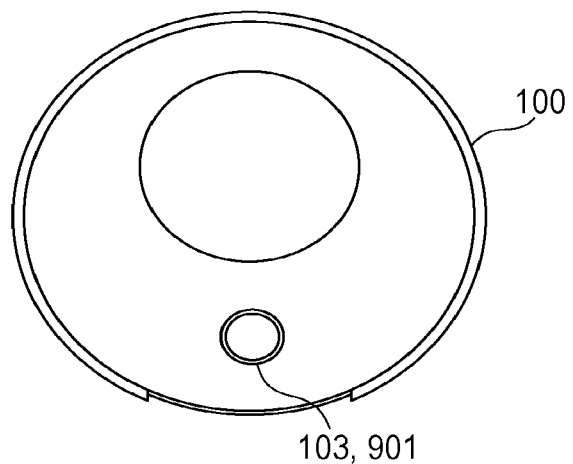
FIG. 42A is a top view of a ring-shaped fingerprint input portion.
Figure 42B:
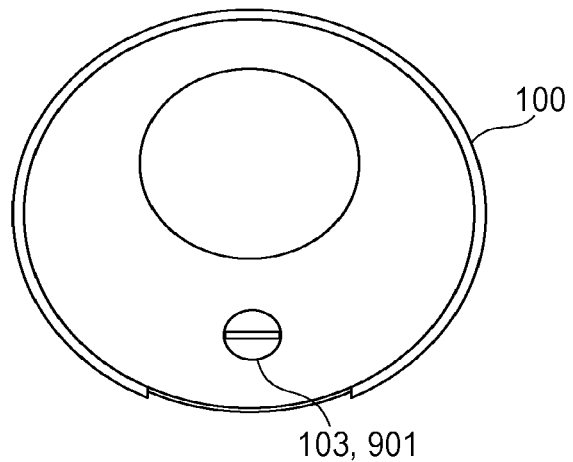
FIG. 42B is a top view of a line-shaped fingerprint input portion.

FIGS. 42A and 42B illustrate example configurations of the fingerprint input portion 901. In the examples illustrated in FIGS. 42A and 42B, the operation input portion 103 also serves as the fingerprint input portion 901. FIG. 42A illustrates an example in which the operation input portion 103 in the bottle storage 100 is provided with a ring-shaped fingerprint input portion 901, and FIG. 42B illustrates an example in which the operation input portion 103 in the bottle storage 100 is provided with a line-shaped fingerprint input portion 901. Since the ring-shaped fingerprint input portion 901 and the line-shaped fingerprint input portion 901 may have known structures that are utilized in smartphones and so on, descriptions thereof are not given hereinafter.

<3-5>

Figure 43:
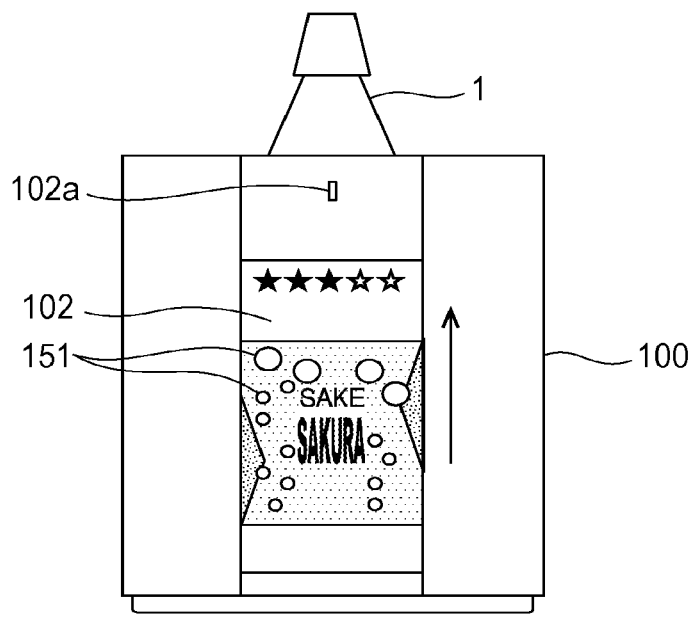
FIG. 43 illustrates what is displayed on a display portion when a sparkling beverage is inserted into the bottle storage.

Although the description in the above embodiment has been mainly given of an example in which a brand identified by the information manager 223 and relevant information regarding the identified brand are displayed on the display portion 102, for example, an image like that illustrated in FIG. 43 may be displayed on the display portion 102. FIG. 43 illustrates a case in which air bubbles 151 that are rising while wobbling from side to side are displayed on the display portion 102 in addition to a label image, since the beverage of the brand of a bottle inserted into the bottle storage and identified is a sparkling beverage. This allows the user to recognize the characteristics of the beverage in the bottle storage 100 at a glance.

<3-6>

For example, information about music may be stored in the brand database 225 in association with content IDs (CIDs), and the bottle storage may have a music output portion that plays and outputs music corresponding to the brand of an inserted bottle (i.e., a content ID). With this configuration, since music that matches a bottle brand is played, the user can more enjoy drinking. Specifically, as illustrated in FIG. 44, sound source information (sound sources) may also be stored in a table, in which display images to be displayed on the display portion 102 are stored, in association with content IDs. This table is stored, for example, in the brand database 225. The sound sources may be stored in the bottle storage 100 or 200 and may be obtained over the Internet.

<3-7>

When a curved mirror is provided between each of the image capture portions 105 in the bottle storages 100 and 200 and the bottle 1, an image of an entire label can be captured even in a small space, and each of the bottle storages 100 and 200 can be further miniaturized. In order for the image capture portion 105, including a camera or the like, to capture an image of an entire label, the image capture portion 105 and the bottle 1 need to be placed a predetermined distance (e.g., 5 cm) or more away from each other, based on a relationship with the viewing angle of the camera and so on. When the image capture portion 105 is to be simply placed away in a direction in which it is orthogonal to the surface of the bottle 1, the size of the outer shape of each of the bottle storages 100 and 200 needs to be increased correspondingly. When the curved mirror is provided, an entire label can be fit in the field of view of the camera even when the distance between the bottle 1 and the camera is reduced, and thus each of the bottle storages 100 and 200 can be miniaturized.

Figure 45A:
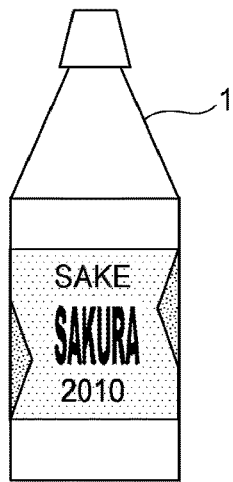
FIG. 45A is a view illustrating a bottle to be photographed.
Figure 45B:
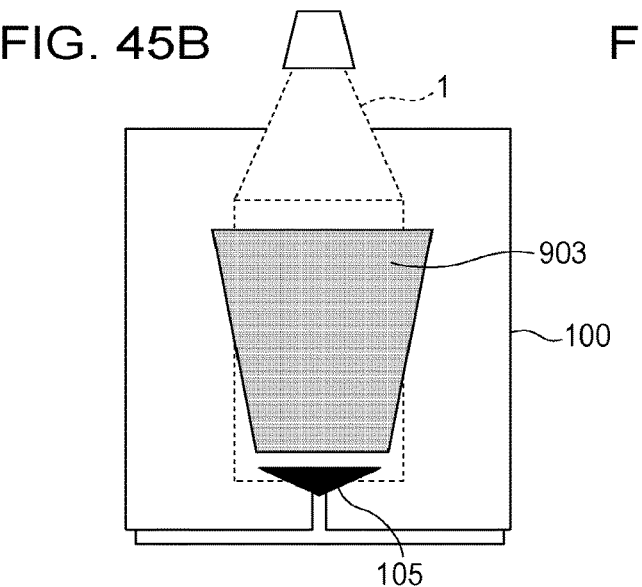
FIG. 45B is a schematic view illustrating an example of arrangement of a curved mirror, viewed from a front direction.
Figure 45C:
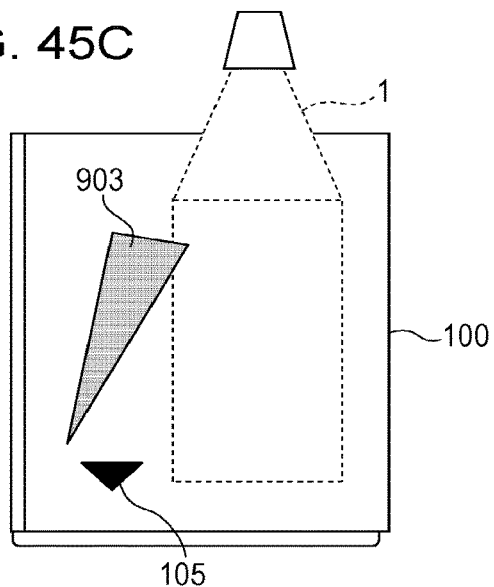
FIG. 45C is a schematic view illustrating an example of arrangement of the curved mirror, viewed from a side direction.
Figure 45D:
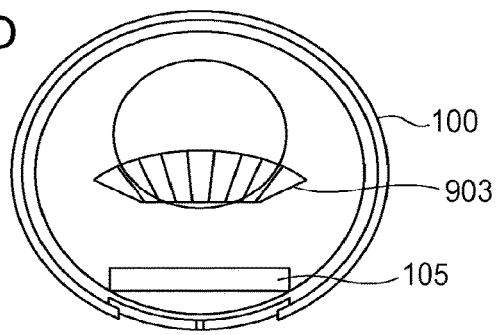
FIG. 45D is a schematic view illustrating an example of the arrangement of the curved mirror, viewed from an upper direction.

FIGS. 45A to 45C illustrate examples of label photography using a curved mirror 903. FIG. 45A is a view of the bottle 1 to be photographed. FIG. 45B is a schematic view illustrating an example of arrangement of the curved mirror 903, viewed from a front direction. FIG. 45C is a schematic view illustrating an example of the arrangement of the curved mirror 903, viewed from a side direction. FIG. 45D is a schematic view illustrating an example of the arrangement of the curved mirror 903, viewed from an upper direction. The curved mirror 903 is arranged along a vertical direction of the bottle 1 inserted into the bottle storage 100, and the image capture portion (camera) 105 is disposed so as to photograph the mirror surface of the curved mirror 903. In the illustrated example, the image capture portion 105 is disposed below the curved mirror 903. The curved mirror 903 is curved so that, for example, a larger label image is acquired for an upper portion in the label, the portion being farther from the image capture portion (camera) 105. With this arrangement, even when the distance between the image capture portion (camera) 105 and the label is small, the entire label can be fit in the field of view of the image capture portion 105. Since the use of the curved mirror 903 can acquire a curved image, the image analyzer 222 (FIG. 15) or the like may convert the curved image back into an image that is not curved.

<3-8>

The sound input/output portion 141 can also output various types of information by means of sound. For example, the sound input/output portion 141 may output the brand of the bottle 1 inserted into the bottle storage 100 and information related to the brand by means of sound. That is, the bottle storage 100 may have a configuration for outputting a brand identified by the information manager 223 and/or relevant information related to the identified brand by means of sound.

When a sensor for detecting a remaining amount of beverage in the bottle 1 is provided, the sound input/output portion 141 may inform the user, restaurant/bar staff, or the like by outputting sound indicating that the remaining amount of the beverage has decreased. Naturally, an image or LED lighting may be used to inform the user, restaurant/bar staff, or the like that the remaining amount has decreased.

Each of the bottle storages 100 and 200 may have a dialogue-type configuration. For example, in response to a request that is input from the sound input/output portion 141 by means of voice, the sound input/output portion 141 may output information, read from the log-information storage unit 224 or the brand database 225, by means of voice or sound.

<3-9>

Although the bottle storage according to the present embodiment may have a configuration for obtaining power through a cord, it may have a system configuration for obtaining power in a cordless manner via contactless power supply. When the contactless power supply is employed, a cord does not become a nuisance, and each of the bottle storages 100 and 200 can be easily moved to a desired table.

<3-10>

In the bottle storage in the present embodiment, the distance between a bottle 1 and the image capture portion 105 may be adjusted. Specifically, the bottle storage further has a mechanism for moving the bottle 1 in directions in which the bottle 1 housed therein and the image capture portion 105 oppose each other (hereinafter, this mechanism may also be referred to as a "front-and-back movement portion", and the directions may also be referred to as "front-and-back directions"), and the controller 221 controls bottle movement in the front-and-back directions which is performed by the front-and-back movement portion. More specifically, upon determining that it is difficult to recognize a label, the controller 221 causes the front-and-back movement portion to move the bottle in the front-and-back directions. For example, the determination as to whether or not it is difficult to recognize a label may be a determination as to the presence/absence or the degree of blur on a label in an image, a determination as to the position (the center position) of the bottle in the front-and-back directions, or the like. The front-and-back movement portion may be a device utilizing the cooling-warming devices 104. For example, the front-and-back movement portion may push the bottle 1 to the center of the housing portion 101 by using some of two or more parts included in the cooling-warming devices 104.

<3-11>

The bottle storage in the present embodiment may control lighting for the image capture. Specifically, the controller 221 causes the image capture portion 105 to capture images under a plurality of lighting conditions and selects an image for label recognition from the captured images. For example, the controller 221 causes the lighting portion 226 to light up under a plurality of lighting conditions and causes the image capture portion 105 to capture images under the respective lighting conditions. The image analyzer 222 evaluates the recognition rates of a label in the images captured by the image capture portion 105. Then, the most highly evaluated image of the captured images is used for processing for identifying a brand.

Also, a pattern for recognizing gloss of the label may be provided on an inner surface of the bottle storage in the present embodiment, and the bottle storage may utilize the pattern to recognize the label. There are cases in which a label on the bottle is made of glossy material, such as gold or silver. In such cases, there is a possibility that light for image capture is reflected by the label, and the entire or part of the label becomes glossy to thereby cause false recognition of the label. Accordingly, a particular pattern is applied to a portion around the image capture portion 105. When a glossy portion exists in an image captured by the image capture portion 105, the image analyzer 222 determines whether or not the particular pattern is shown in the glossy portion. Upon determining that the particular pattern is shown in the glossy portion, the image analyzer 222 also regards the glossy portion as part of the label and performs label recognition processing thereon.

<3-12>

The bottle storage in the present embodiment may control image capture of a bottle in accordance with the position where the bottle is placed. Specifically, the bottle storage further includes a weight sensor, and the controller 221 controls focusing of the image capture portion 105 on the basis of information obtained from the weight sensor. For example, the bottle storage further includes a plurality of weight sensors, and the controller 221 determines the position of the bottle in the housing portion 101 (or on the bottle table 117) on the basis of information obtained from the plurality of weight sensors. Upon determining that the position of the bottle is closer to the image capture portion 105 than to the center of the housing portion 101, the controller 221 causes the image capture portion 105 to set the focus position to a closer position. Upon determining that the position of the bottle is farther from the image capture portion 105 than from the center of the housing portion 101, the controller 221 causes the image capture portion 105 to set the focus position to a farther position. The focusing of the image capture portion 105 may further be controlled in accordance with the thickness (in other words, the width in the front-and-back directions) of the bottle.

The bottle storage may also inform the user of the remaining amount of the beverage in the bottle by using information obtained from the weight sensor(s). For example, the image analyzer 222 determines whether or not the color of the bottle is a predetermined color (e.g., brown or black) on the basis of a bottle image obtained from the image capture portion 105. When the color of the bottle is the predetermined color, the information manager 223 determines the entire bottle weight on the basis of the information obtained from the weight sensor(s) and calculates a net volume obtained by subtracting the weight of the bottle itself (i.e., the bottle container) from the entire bottle weight, that is, calculates the remaining amount of the beverage. The controller 221 then causes the display portion 102 to display an image indicating the calculated remaining amount. For example, the image may be superimposed on the brand that is already displayed or may be displayed independently from the brand. The controller 221 may also cause the notifier 102*a* to notify the user of the remaining amount. For example, the remaining amount may be displayed on the notifier 102*a* in the form of a scale.

<3-13>

Figure 46:
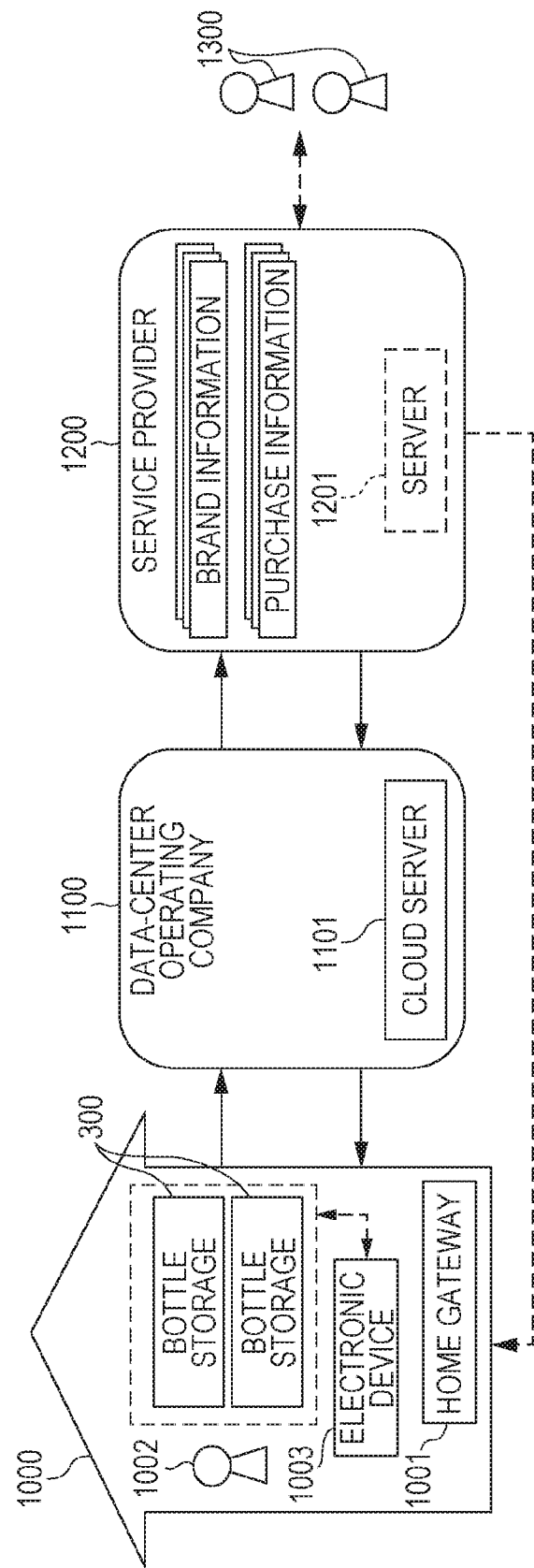
FIG. 46 is a schematic diagram illustrating a specific example of a system constructed using the bottle storage in the embodiment.

FIG. 46 is a schematic diagram illustrating a specific example of a system constructed using one of the bottle storages in the above-described embodiment. The bottle storage may be any of the bottle storages in the above-described embodiment, as long as it is provided with a communicator. In FIG. 46, the bottle storage 300 is used by way of example.

A group 1000 is, for example, a company, an entity, or a household, and the scale thereof is not limited. At the group 1000, a plurality of bottle storages 300 and a home gateway 1001 are provided. One or more of the bottle storages 300 can connect to the Internet, and one or more of the bottle storages 300 are not able to connect to the Internet on their own. The bottle storage(s) 300 that are (is) not able to connect to the Internet on their own may be able to connect to the Internet via the home gateway 1001. Also, the group 1000 includes a user 1002 who uses the bottle storages 300. Each bottle storage 300 may be able to communicate with an electronic device 1003, such as a smartphone, used by the user 1002.

A data-center operating company 1100 has a cloud server 1101. The cloud server 1101 is a virtualization server that cooperates with various types of device through the Internet. The cloud server 1101 mainly manages, for example, big data that is difficult to process with a typical database management tool or the like. The data-center operating company 1100 performs data management, management of the cloud server 1101, operations of a data center that performs the management, and so on.

Each bottle storage 300 may communicate with the cloud server 1101 indirectly via a personal gateway, such as a mobile phone or a wireless communication router. Each bottle storage 300 may also communicate with the cloud server 1101 directly without involvement of a gateway.

Figure 47A:
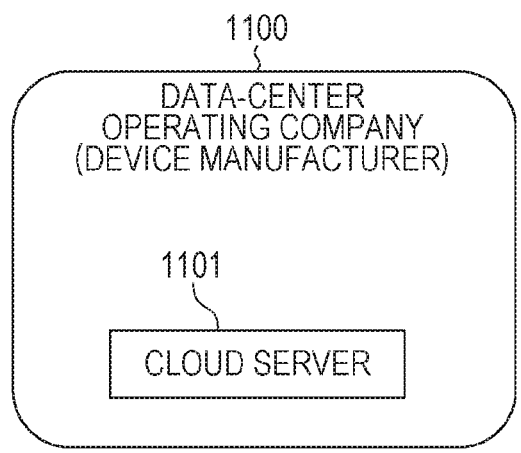
FIG. 47A is a diagram illustrating an example in which a device manufacturer operates a cloud server.
Figure 47B:
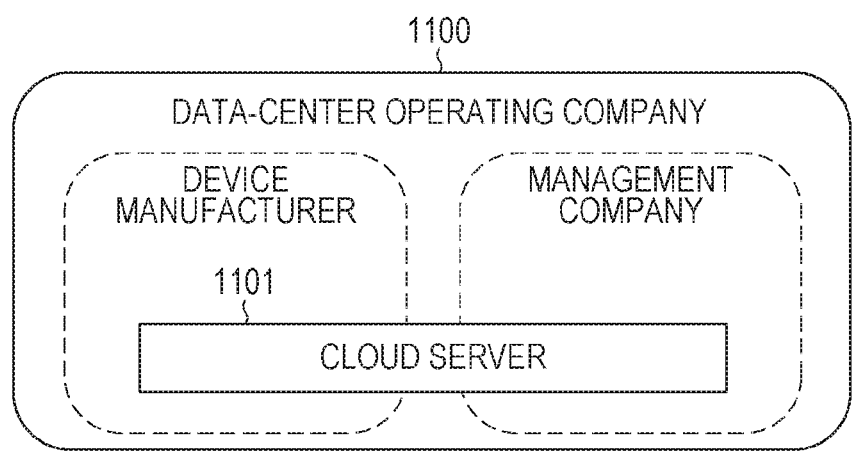
FIG. 47B is a diagram illustrating an example in which a device manufacturer and a management company operate a cloud server in cooperation with each other or in a shared manner.

In this case, the data-center operating company 1100 is not limited to a company that performs only data management, operations of the cloud server 1101, or the like. For example, as illustrated in FIG. 47A, a device manufacturer that develops and manufactures one of the bottle storages 300 may also perform data management, management of the cloud server 1101, and so on. In this case, the device manufacturer corresponds to the data-center operating company 1100. The data-center operating company 1100 is not limited to a single company. For example, as illustrated in FIG. 47B, the device manufacturer and another management company may perform the data management and the operation of the cloud server 1101 in cooperation with each other or in a shared manner. In this case, one of or both the device manufacturer and the other management company correspond(s) to the data-center operating company 1100.

A service provider 1200 has a server 1201. The scale of the server 1201 as used herein is not limited, and examples of the server 1201 also include a memory in a personal computer (PC) and so on. The service provider 1200 may or may not have the server 1201.

In the service described above, the home gateway 1001 is not essential. For example, when the cloud server 1101 performs all data management, the home gateway 1001 is not necessary. There are also cases in which a device that is not able to connect to the Internet on their own is not provided, as in a case in which all devices in a home are connected to the Internet.

Next, a description will be given of a flow of information in the above-described service.

Each of the bottle storages 300 for the group 1000 transmits log information to the cloud server 1101 in the data-center operating company 1100. The cloud server 1101 aggregates the log information of the bottle storages 300.

There are also cases in which the log information is directly supplied from the bottle storages 300 to the cloud server 1101 through the Internet. The log information from the bottle storages 300 may be temporarily aggregated in the home gateway 1001 and be supplied from the home gateway 1001 to the cloud server 1101.

Then, the cloud server 1101 in the data-center operating company 1100 supplies the aggregated log information to the service provider 1200 in a certain unit of information. The certain unit of information may be a unit with which the data-center operating company 1100 can organize the aggregated information and can supply it to the service provider 1200 or may be a unit requested by the service provider 1200. The log information may also be provided in a unit other than the aforementioned certain unit of information, and there are also cases in which the amount of information that is provided varies depending on the situation.

The log information is stored in the server 1201 of the service provider 1200, as appropriate. The service provider 1200 then organizes the log information into information that suits a service to be provided to users, and provides the service to the users. The users to which the information is to be provided may include the user 1002 who uses any of the bottle storages 300 or may be users 1300 who manage and operate the bottle storages 300. The users 1300 are, for example, managers of eating and drinking establishments. The users to which the information is to be provided may be outside users.

The service may be directly provided, for example, from the service provider 1200 to the users. The service may be provided to the users, for example, after going through the cloud server 1101 in the data-center operating company 1100 again. The cloud server 1101 in the data-center operating company 1100 may also organize the log information into information that suits the service to be provided to the users, and may provide the service to the service provider 1200.

The user 1002 and one of the users 1300 may be the same or may be different from each other.

<4> Advantages of Embodiment

As described above, according to the present embodiment, since the image capture portion 105 that captures an image of a bottle 1 housed in the housing portion 101 and the information manager 223 that identifies at least the brand of the bottle on the basis of the image of the bottle 1 which is captured by the image capture portion 105 are provided, it is possible to realize the bottle storages 100, 200, 300, 700, and 900 and a bottle-storage-utilizing system that can improve visibility of labels and can further offer a drinking environment where drinking is fun.

In the present disclosure, the types, the arrangement, the number of members, and so on are not limited to those in the above-described embodiment, and changes, such as replacing the constituent elements in the embodiment with elements that provide substantially the same advantages, can be made thereto as appropriate within the scope that does not depart from the spirit and scope of the present disclosure.

A bottle storage according to the present disclosure includes: a housing portion that houses a bottle therein; a cooling-warming portion that is provided around the housing portion; a rotation portion that rotates the bottle housed in the housing portion; an image capture portion that captures an image of the bottle housed in the housing portion; a controller that controls the bottle rotation performed by the rotation portion and the image capture performed by the image capture portion, based on the bottle image captured by the image capture portion; an information manager that identifies at least a brand of the bottle, based on the bottle image captured by the control of the controller; and an output portion that outputs at least one of the brand identified by the information manager and relevant information regarding the identified brand. Thus, information regarding the brand of a bottle to be cooled can be presented to a user in an easily viewable manner.

In the bottle storage in the present disclosure, the controller may control the bottle rotation performed by the rotation portion, based on how a label on the bottle is shown in the bottle image, and may control the image capture performed by the image capture portion in accordance with the rotation of the bottle. Thus, the rotation and the image capture are controlled with respect to the label, thereby making it possible to efficiency identify the brand.

In the bottle storage of the present disclosure, when the label on the bottle is not shown in the bottle image to a degree that the brand of the bottle is identifiable, the controller may cause the rotation portion to rotate the bottle and cause the image capture portion to capture an image of the bottle in accordance with the rotation of the bottle. Thus, the bottle is rotated when the brand is not identifiable, thus making it possible to optimize the rotation operation.

In the bottle storage of the present disclosure, whether or not the label on the bottle is shown to a degree that the brand of the bottle is identifiable may be determined based on at least one of a recognition degree of an element on the label and a form of an edge of the label. Thus, the bottle can be rotated to a degree that the label can be accurately recognized, and the rotation operation can be further optimized.

In the bottle storage of the present disclosure, the controller may cause the rotation portion to rotate the bottle by a predetermined angle, cause the image capture portion to capture an image of the bottle, each time the bottle is rotated by the predetermined angle, and may cause the rotation portion to stop the rotation of the bottle when the label on the bottle is shown in the bottle image to the degree that the brand of the bottle is identifiable, the bottle image being captured each time the bottle is rotated by the predetermined angle. Thus, since the rotation is stopped at the front of the label, it is not necessary to perform the rotation for subsequent recognize.

The bottle storage in the present disclosure may further include a raising-and-lowering portion that raises and lowers the bottle in the housing portion, and the control performed by the controller may include control on the raising and lowering performed by the raising-and-lowering portion. Thus, even when the label is displaced from an image-capture region in a vertical direction, the label can be recognized.

In the bottle storage in the present disclosure, the controller may control the bottle rotation performed by the rotation portion and the bottle raising and lowering performed by the raising-and-lowering portion, based on how the label on the bottle is shown in the bottle image, and may control the image capture performed by the image capture portion, in accordance with the bottle rotation and the bottle raising and lowering. Thus, the rotation and the image capture are controlled with respect to the label, thereby making it possible to efficiency identify the brand.

In the bottle storage of the present disclosure, when the label on the bottle is not shown in the bottle image to a degree that the brand of the bottle is not identifiable, the controller may cause the rotation portion to rotate the bottle, cause the raising-and-lowering portion to raise or lower the bottle, and cause the image capture portion to capture an image of the bottle in accordance with the bottle rotation and the bottle raising or lowering. Thus, the bottle is rotated when the brand is not identifiable, thus making it possible to optimize the rotation operation.

The bottle storage in the present disclosure may further include a brand database that stores label images of a plurality of brands therein, and the information manager may identify the brand of the bottle by verifying a label image of the bottle, the label image being captured by the image capture portion, against the label images stored in the brand database.

In the bottle storage in the present disclosure, the output portion may include a display portion that displays at least one of the brand identified by the information manager and the relevant information regarding the identified brand.

The bottle storage in the present disclosure may further include a communicator that transmits at least one of the brand identified by the information manager and the relevant information regarding the identified brand to an external device.

The bottle storage in the present disclosure may further include a log-information storage unit that stores therein log information regarding each bottle inserted into the housing portion.

The bottle storage in the present disclosure may further include a brand database that stores label images of a plurality of brands therein. The information manager may identify the brand of the bottle by verifying a label image of the bottle, the label image being captured by the image capture portion, against the label images stored in the brand database; and the log-information storage unit may store therein, as the log information, at least the brand identified by the information manager.

The bottle storage in the present disclosure may further include an operation input portion that is capable of inputting a user's favorite level for the brand, and the log-information storage unit may store therein the favorite level in association with the brand.

In the bottle storage in the present disclosure, the relevant information regarding the brand, the relevant information being displayed by the display portion, may include at least one of a food that goes well, taste, brewery information, and a favorite level.

In the bottle storage in the present disclosure, the relevant information regarding the brand, the relevant information being transmitted by the communicator, may include at least one of a food that goes well, taste, brewery information, and a favorite level.

The bottle storage in the present disclosure may include a curved mirror, and the image capture portion may capture an image of the bottle via the curved mirror.

A system in the present disclosure includes: a housing portion that houses a bottle therein; a cooling-warming portion that is provided around the housing portion; a rotation portion that rotates the bottle housed in the housing portion; an image capture portion that captures an image of the bottle housed in the housing portion; a communicator that transmits the bottle image captured by the image capture portion and that receives a recognition result of the bottle image and relevant information regarding a brand of the bottle; a controller that controls the bottle rotation performed by the rotation portion and the image capture performed by the image capture portion, based on the recognition result; and an output portion that outputs the relevant information regarding the brand. The information processing device includes: a communicator that receives the bottle image and that transmits the recognition result and the relevant information regarding the brand; and an information manager that recognizes an object shown in the bottle image and that identifies at least the brand of the bottle, based on the bottle image.

The bottle storage and the system in the present disclosure can offer an advantage that information regarding the brand of a bottle to be cooled can be presented to a user in an easily viewable manner, and are useful for a bottle storage for a wine bottle or the like and a system including a bottle storage.

What is claimed is:

1. A bottle storage comprising:
   a housing portion that houses a bottle therein;
   a cooling-warming portion that is provided around the housing portion;
   a sensor which detects insertion of the bottle into the housing portion;
   an image capture portion that captures an image of the bottle housed in the housing portion;
   a controller that causes the image capture portion to perform image capture for capturing the image of the bottle when the bottle is sensed to be inserted into the housing portion by the sensor;
   an information manager that identifies at least a brand of the bottle, based on recognition result of the bottle image captured by the control of the controller; and
   an output portion that outputs characteristics of a beverage of the brand identified by the information manager.

2. The bottle storage according to claim 1,
   wherein the beverage includes a sparkling beverage; and the characteristics includes air bubbles.

3. The bottle storage according to claim 1,
   wherein the information manager further obtains a remaining amount of beverage in the bottle; and
   the output portion further outputs the remaining amount of the beverage.

4. The bottle storage according to claim 3, further comprising:
   a sensor for detecting the remaining amount of the beverage,
   wherein the information manager obtains the remaining amount from the sensor.

5. The bottle storage according to claim 3, further comprising:
   a weight sensor,
   wherein the information manager obtains information from the weight sensor and calculates the remaining amount of the beverage based on the information.

6. The bottle storage according to claim 5, further comprising:
   an image analyzer that determines whether or not the color of the bottle is a predetermined color based on the image of the bottle,
   wherein the information manager, when the color of the bottle is the predetermined color, calculates the remaining amount of the beverage.

* * * * *